Figure 1:
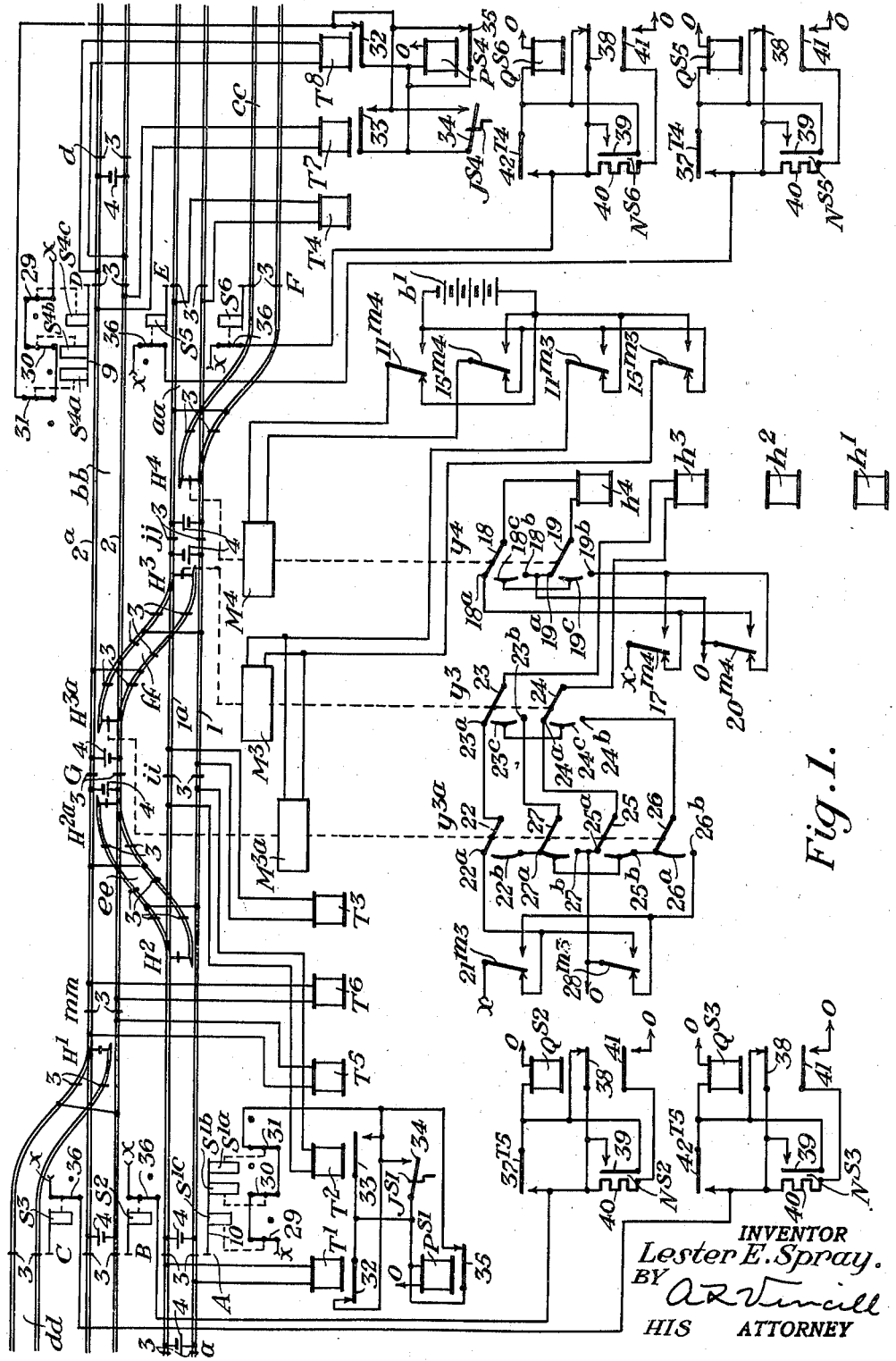

June 24, 1941. L. E. SPRAY 2,247,071
INTERLOCKING CONTROL APPARATUS
Filed May 22, 1934 9 Sheets-Sheet 1

INVENTOR
Lester E. Spray.
BY
HIS ATTORNEY

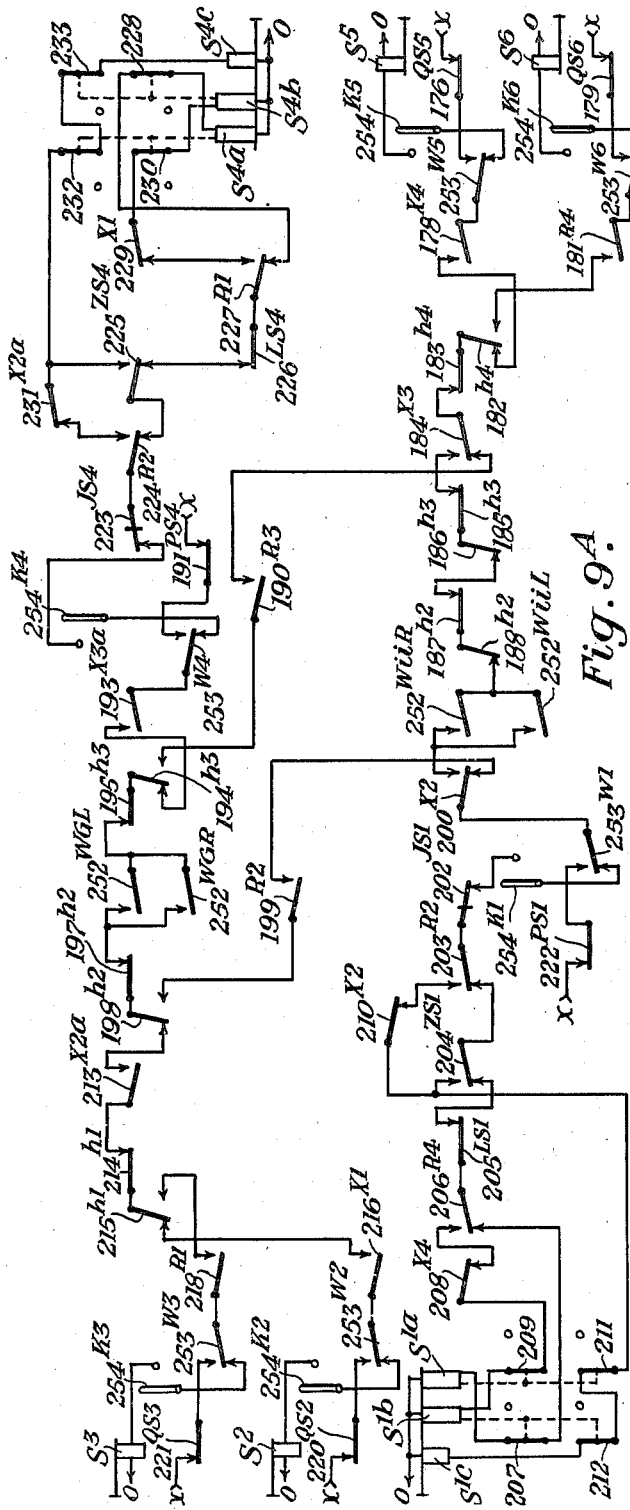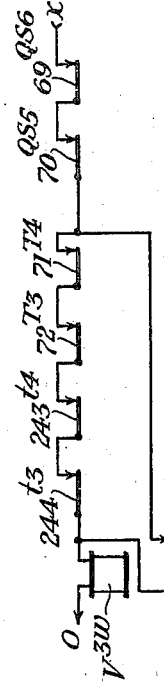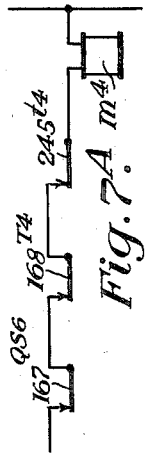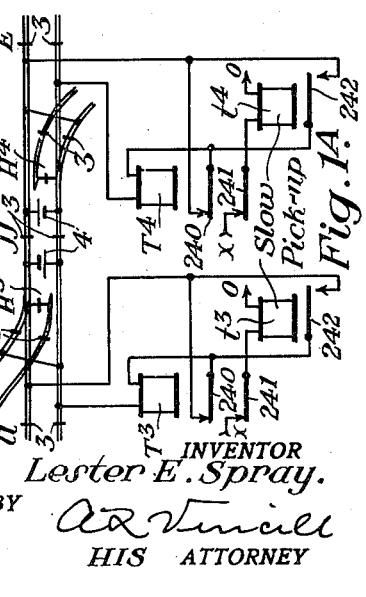

June 24, 1941.　　　L. E. SPRAY　　　2,247,071
INTERLOCKING CONTROL APPARATUS
Filed May 22, 1934　　　9 Sheets-Sheet 3
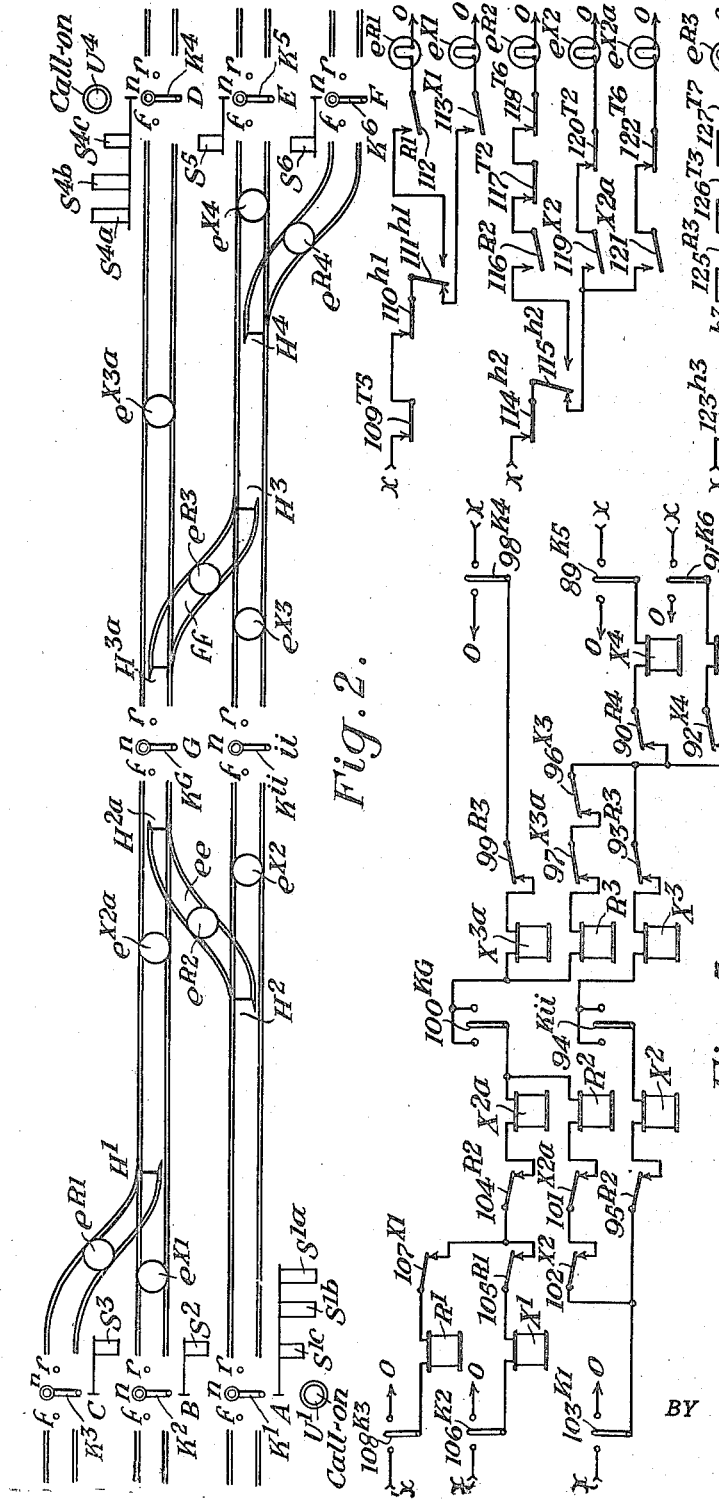

June 24, 1941.  L. E. SPRAY  2,247,071
INTERLOCKING CONTROL APPARATUS
Filed May 22, 1934  9 Sheets-Sheet 4
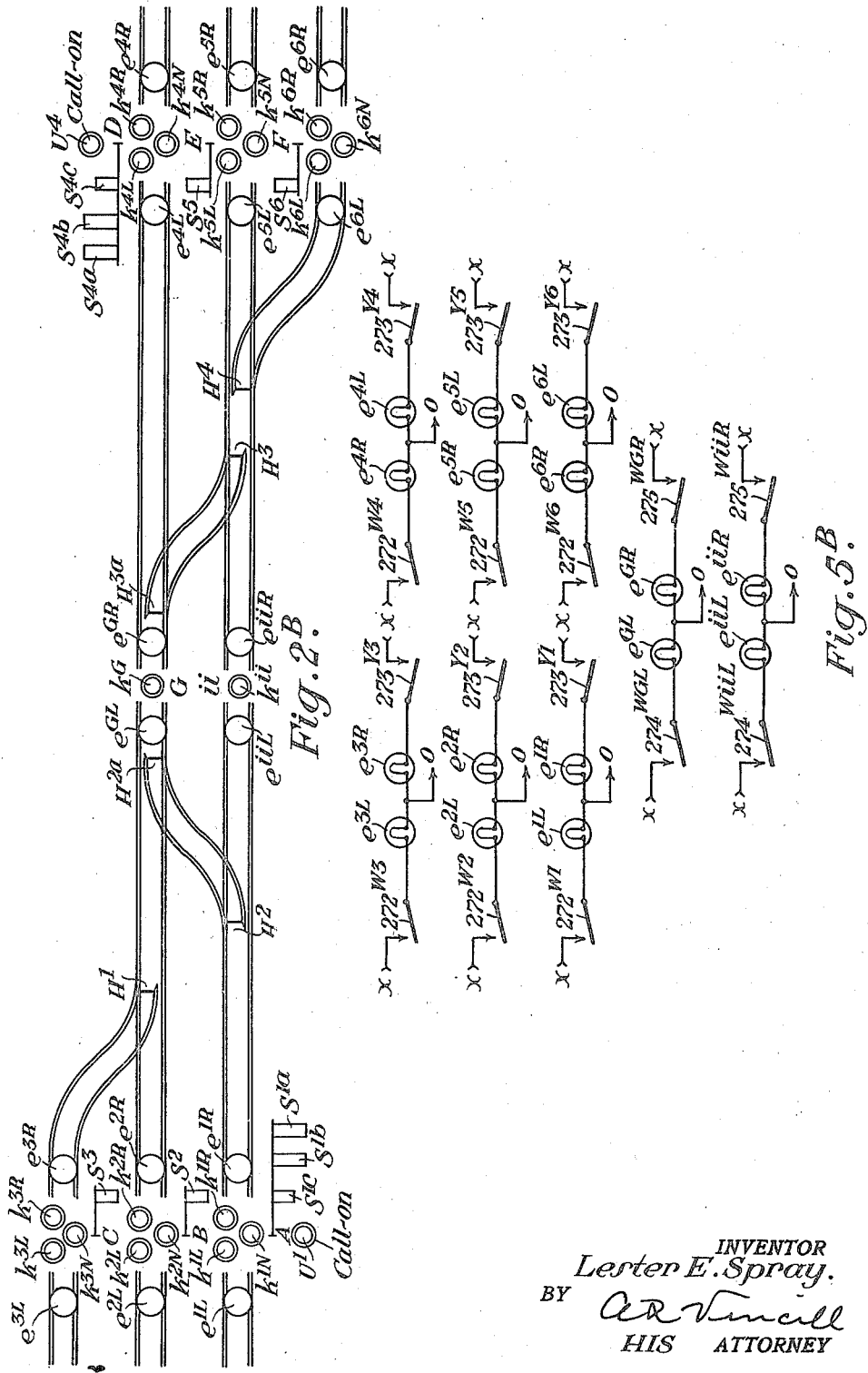
INVENTOR
Lester E. Spray.
BY
HIS ATTORNEY June 24, 1941.  L. E. SPRAY  2,247,071
INTERLOCKING CONTROL APPARATUS
Filed May 22, 1934　9 Sheets-Sheet 5

INVENTOR
Lester E. Spray.
BY
HIS ATTORNEY

June 24, 1941.  L. E. SPRAY  2,247,071
INTERLOCKING CONTROL APPARATUS
Filed May 22, 1934    9 Sheets-Sheet 7
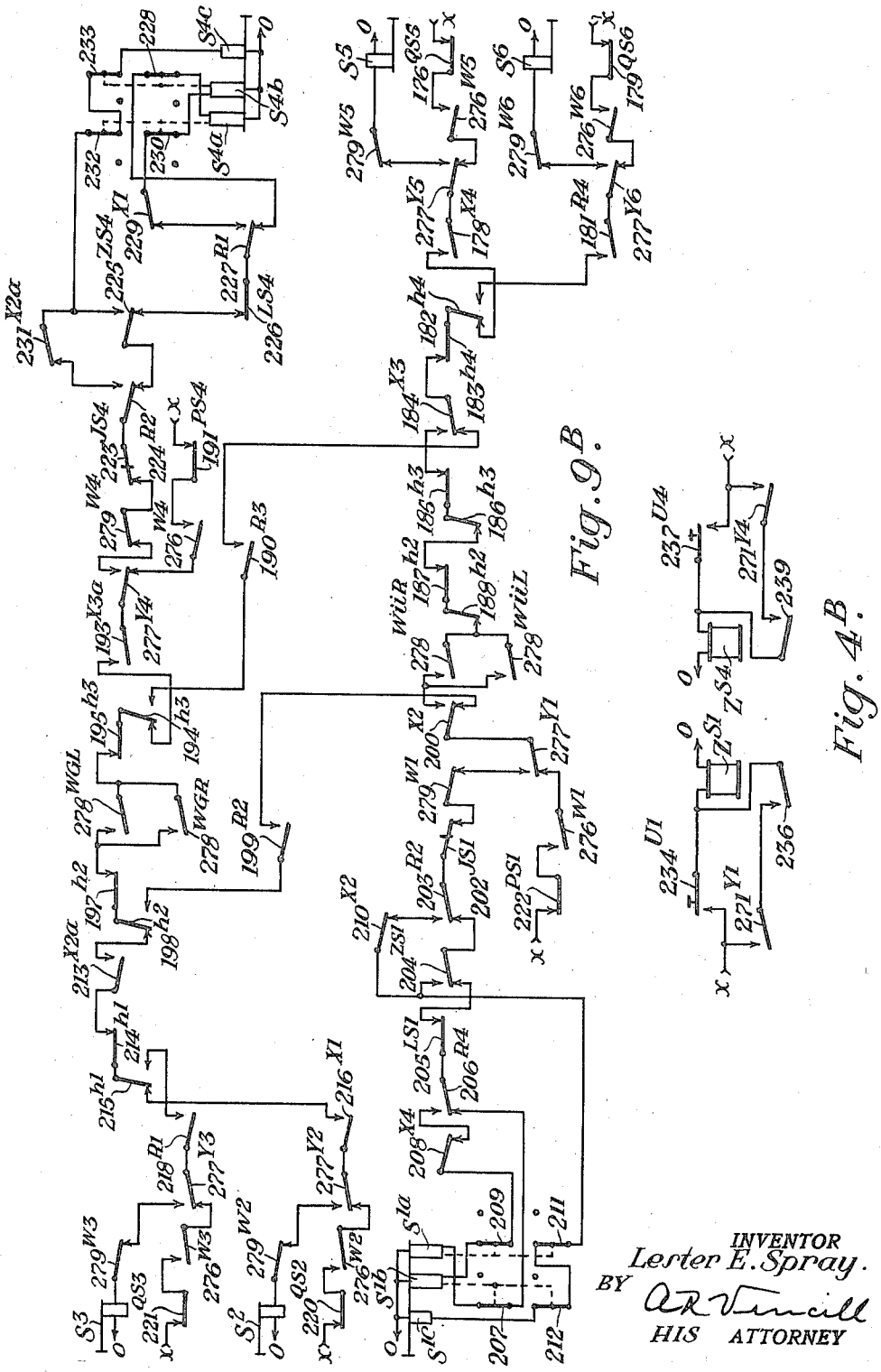
INVENTOR
Lester E. Spray.
BY
HIS ATTORNEY

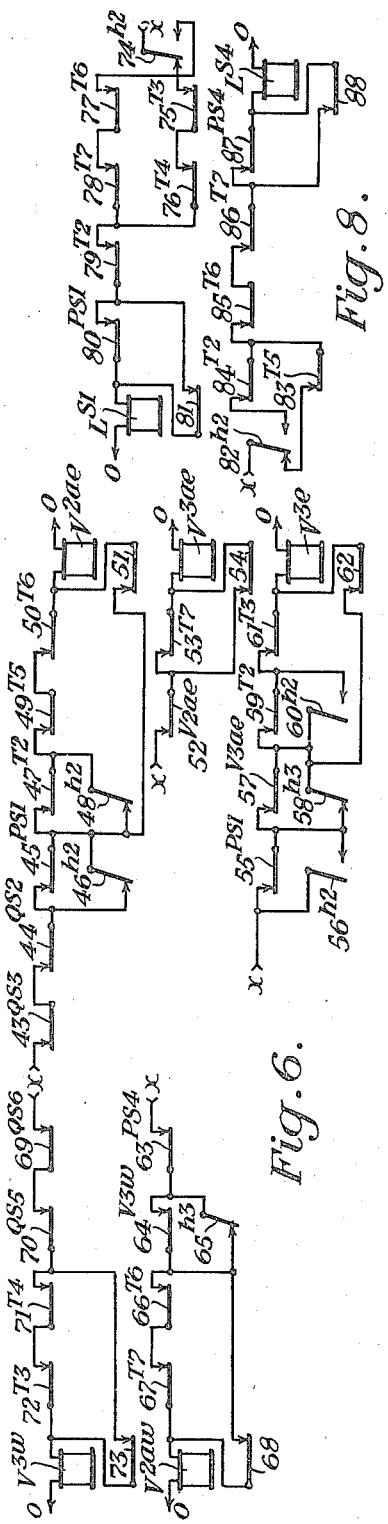
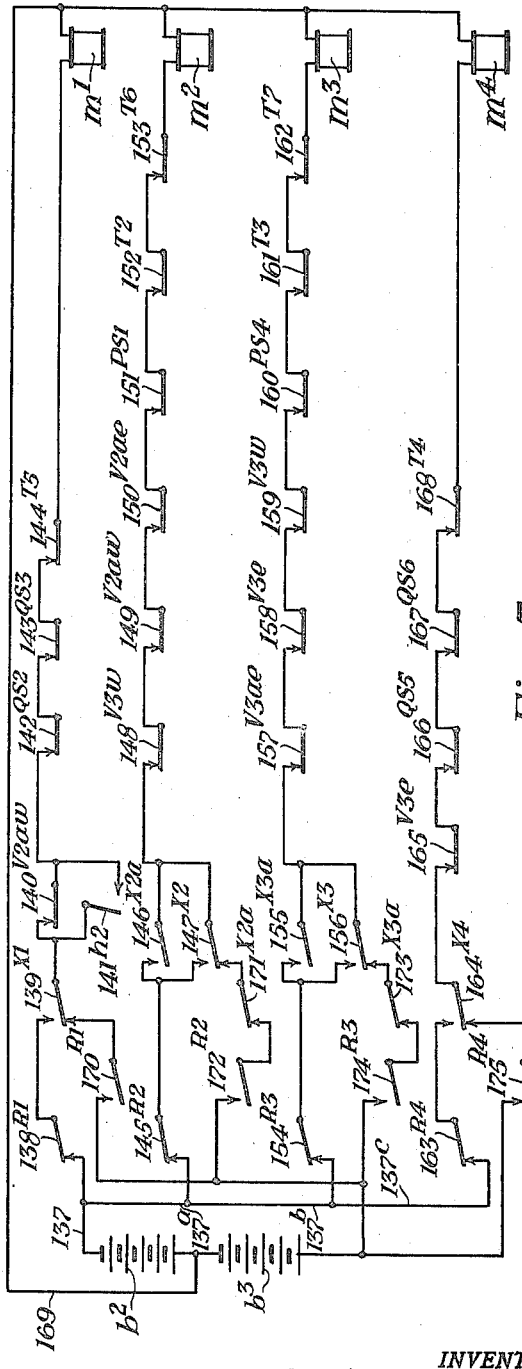

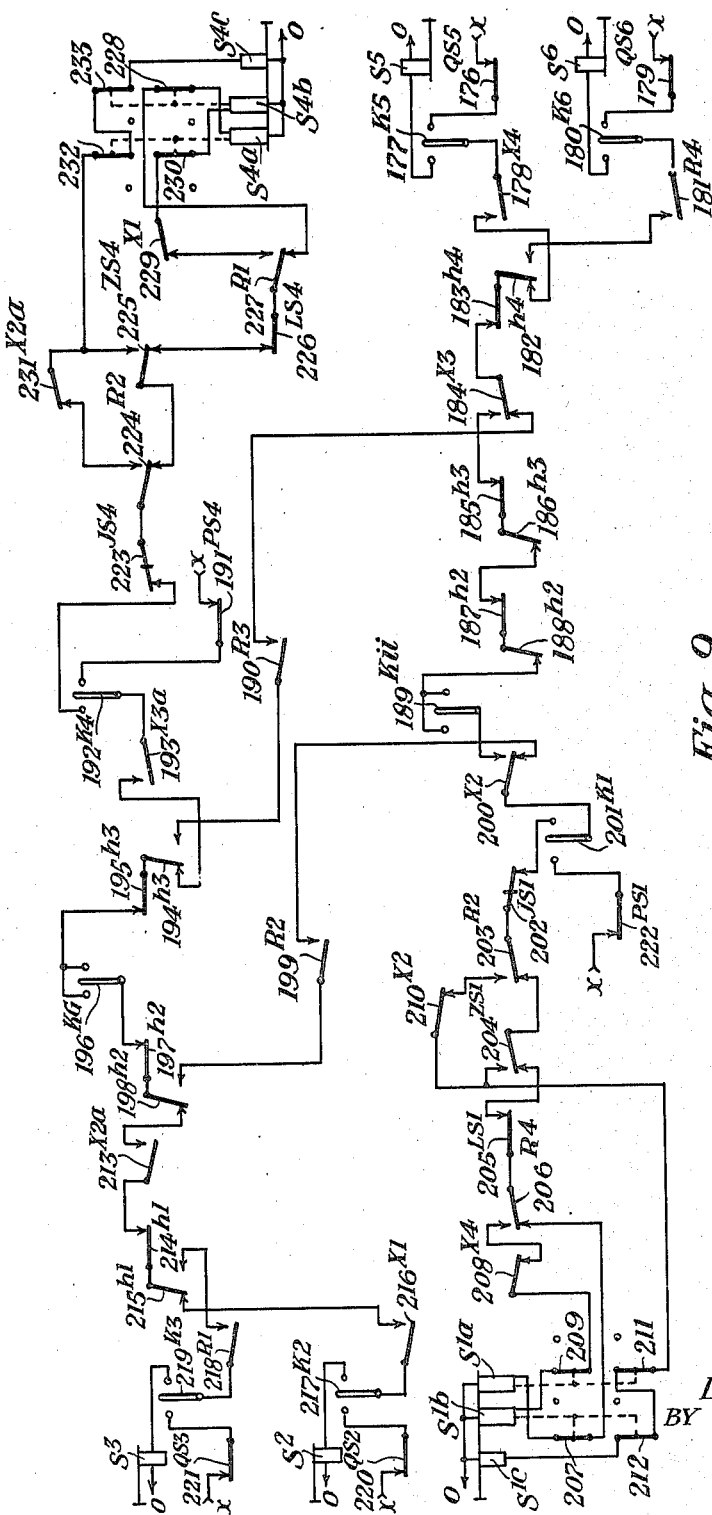

Patented June 24, 1941

2,247,071

UNITED STATES PATENT OFFICE 2,247,071

INTERLOCKING CONTROL APPARATUS

Lester E. Spray, Wilkinsburg, Pa., assignor to The Union Switch & Signal Company, Swissvale, Pa., a corporation of Pennsylvania Application May 22, 1934, Serial No. 726,957

80 Claims. (Cl. 246—134)

My invention relates to interlocking control apparatus, and is particularly adapted for, though not limited to, the control of railway track switches and signals in a railway switching or interlocking layout.

One feature of my invention is the provision of novel and improved interlocking control apparatus without the use of interlocked levers. Another feature of my invention is the provision of novel and improved indication apparatus associated with such interlocking control apparatus.

More particularly, the principal object of my invention is the provision of a system of route interlocking which is an improvement upon the systems disclosed in my copending applications, Serial No. 323,286, filed December 3, 1928, and Serial No. 561,422 filed September 5, 1931, for Multiple control apparatus.

In the systems of these prior applications, I provide a control board having thereon a miniature diagram of the track layout, with route buttons for controlling the switches and signals identified by their location on the track diagram at points corresponding to the signal locations. A similar control board is employed herein, in three different forms. In the first form, rotary buttons which may be turned in either direction from a normal position are used, as in the system of my application, Serial No. 323,286, and the routes are established and the corresponding signals are cleared in a similar manner, namely by operating the two buttons for the signal locations at the opposite ends of the route, in one direction or the other according to the direction of the traffic movement desired. One object of the present invention is the provision in a system of this character, of an improved arrangement of interlocked route relays by means of which all the switches of a route are controlled by the pair of buttons identifying the opposite ends of the route, but which employs a smaller number of relays than required heretofore. This arrangement consists of a route circuit network comprising a plurality of interconnected circuits which include a route circuit for each route extending between contacts controlled by the buttons at its opposite ends and having in series therein a route relay for each switch of the route for operating the switch to the required position.

In another form of the present invention only a momentary operation of the button at the exit end of the representation of a route is required, and the manual cancellation may be effected by merely restoring the button at the entrance end to normal. This is accomplished by the provision of an exit stick relay for each route end, in the route circuit network.

In a third form, separate entrance and exit push buttons replace the rotary buttons and an entrance stick relay is provided for each entrance button so that only a momentary pressing of an entrance button at one end, and of an exit button at the opposite end of the representation of the desired route is required to establish that route and clear the corresponding signal. In this form, the route is cancelled automatically when a train enters the first track section of the route, or is cancelled manually by pressing a cancelling button, as in the system of my prior application Serial No. 561,422.

A feature of the present invention relates to the provision of means for selecting one or another of two alternative routes between two signal locations.

A further feature of my invention relates to improvements in the indication apparatus, comprising the provision of lamps in the tracks of the operator's track diagram for indicating the different routes when established, these lamps being also employed to indicate both the positions of the track switches and to indicate the passage of trains over the routes.

I will describe three forms of apparatus embodying my invention, and will then point out the novel features thereof in claims.

In the accompanying drawings, Figs. 1 to 9, inclusive, are diagrammatic views showing the component parts of one form of apparatus embodying my invention. A second form of apparatus embodying my invention is similar to the first form shown in Figs. 1 to 9, except that the parts of the apparatus shown in Figs. 1, 3, 6, 7 and 9 are modified as shown in Figs. 1A, 3A, 6A, 7A, and 9A, respectively. A third form of apparatus embodying my invention is also similar to the first form, but differs from it in that the parts shown in Figs. 2, 3, 4, 5 and 9 are modified as shown in Figs. 2B, 3B, 4B, 5B, and 9B, respectively.

Similar reference characters refer to similar parts in each of the views.

Referring first to Fig. 1, this drawing shows a stretch of double track railway, tracks $aa$ and $bb$ of which are interconnected through a crossover $ee$ with which they are respectively joined by switches $H^2$ and $H^{2a}$, and are likewise interconnected by a second crossover $ff$ with which they are respectively joined by switches $H^3$ and $H^{3a}$. Tracks $aa$ and $bb$ are also respectively joined to passing sidings cc and dd by switches H⁴ and H¹.

The reference characters 1 and 1ª designate the rails of tracks aa, and the reference characters 2 and 2ª designate the rails of track bb. These rails are divided by insulated joints 3 to form a plurality of track sections a—A, A—ii, ii—jj, jj—E, B—mm, mm—G, G—D and D—d.

Each of these track sections is supplied with current by a battery 4 connected across the rails adjacent one end of the section. A track relay, designated by the reference character T with a distinguishing exponent, is connected across the rails adjacent the opposite end of each track section.

Reference character S, with distinguishing exponents, designates signals which are placed adjacent the points A, B, C, D, E, and F, and which, as here shown, are of the semaphore type. Signals $S^{1a}$, $S^{1b}$ and $S^{1c}$ are mounted on a common mast 10, and signals $S^{4a}$, $S^{4b}$ and $S^{4c}$ are mounted on a common mast 9. Signals $S^{1a}$, $S^{1b}$, $S^{1c}$, $S^{2}$ and $S^{3}$ govern eastbound traffic moves, that is, moves which are made over the stretch of track from left to right as shown in the drawings, and signals $S^{4a}$, $S^{4b}$, $S^{4c}$, $S^{5}$ and $S^{6}$ govern westbound traffic moves, that is, moves which are made over the stretch of track from right to left as shown in the drawings.

Between the group of eastbound signals and the group of westbound signals, eleven different routes may be established according to the position of the various switches. Over each of these routes, traffic can proceed in either direction, that is, from west to east, or from east to west, as controlled by a signal for each direction of traffic over each route.

The arrangements of the switches for these various routes are as given in the following table:

Route 1,—A to E, switches H², H³ and H⁴ normal.
Route 2,—A to F, switches H² and H³ normal, and H⁴ reversed.
Route 3,—A to D, switches H² and H²ᵃ reversed, and H³ᵃ normal.
Route 4,—A to E, switches H², H²ᵃ, H³ᵃ and H³ reversed, and H⁴ normal.
Route 5,—A to F, switches H², H²ᵃ, H³ᵃ, H³ and H⁴ reversed.
Route 6,—B to D, switches H¹, H²ᵃ and H³ᵃ normal.
Route 7,—B to E, switches H¹, H²ᵃ and H⁴ normal, and H³ᵃ and H³ reversed.
Route 8,—B to F, switches H¹ and H²ᵃ normal, and H³ᵃ, H³ and H⁴ reversed.
Route 9,—C to D, switch H¹ reversed, and switches H²ᵃ and H³ᵃ normal.
Route 10,—C to E, switches H¹, H³ᵃ and H³ reversed, and H²ᵃ and H⁴ normal.
Route 11,—C to F, switches H¹, H³ᵃ, H³ and H⁴ reversed, and H²ᵃ normal.

Each track section in which a switch is located will be referred to hereinafter as a detector section. Track sections a—A and D—d in the rear of signals S¹ and S⁴, respectively, will be referred to as approach track sections.

Each switch H is operated by a mechanism, which may be an electric motor or any other suitable device, designated by the reference character M with an exponent corresponding with that of the reference character H for the switch. The mechanisms $M^3$ and $M^{3a}$ for operating switches $H^3$ and $H^{3a}$, respectively, of crossover ff are controlled in multiple by pole-changing contacts of a polarized relay $m^3$, the control for which is shown in Fig. 7. The control of the mechanisms for operating switches $H^2$ and $H^{2a}$ of crossover ee is similar to that for mechanisms $M^3$ and $M^{3a}$, and is therefore not shown in the drawing. Mechanism $M^4$ for operating switch $H^4$ is controlled by pole-changing contacts of a polarized relay $m^4$. The control for the mechanism of switch $H^1$ is similar to that for mechanism $M^4$, and is therefore omitted from the drawings.

Operated in conjunction with each switch H is a circuit controller designated by the reference character y with an exponent corresponding with that of the reference character H for the switch.

The circuit controller $y^4$ is provided with pole-changing contact arms 18 and 19. Polarized relay $m^4$ for controlling operations of switch $H^4$ is also provided with polar contacts $17^{m4}$ and $20^{m4}$. A circuit for controlling a polarized switch indication relay $h^4$ is so controlled by contacts $17^{m4}$ and $20^{m4}$ and by contact arms 18 and 19 of circuit controller $y^4$ that the contacts of indication relay $h^4$ will become closed in the normal direction when switch $H^4$ occupies its normal position while its control relay $m^4$ is energized in the normal direction, and the contacts of indication relay $h^4$ will become closed in the reverse direction when switch $H^4$ occupies its reverse position while relay $m^4$ is energized in the reverse direction. The control of relay $h^1$ by a circuit controller $y^1$ and polarized relay $m^1$ is similar to that for relay $h^4$, and is therefore not shown in the drawings.

Switch circuit controller $y^3$ is provided with contact arms 23 and 24, and circuit controller $y^{3a}$ is provided with contact arms 22, 25, 26 and 27. Contacts $21^{m3}$ and $28^{m3}$ of polarized relay $m^3$, which controls operations of switches $H^3$ and $H^{3a}$, are so associated with contact arms 22, 25, 26 and 27 of circuit controller $y^{3a}$ and contact arms 23 and 24 of circuit controller $y^3$ in the control of a polarized switch indication relay $h^3$ as to cause the polar contacts of relay $h^3$ to be closed in the normal direction when switches $H^3$ and $H^{3a}$ occupy their normal position while relay $m^3$ is energized in the normal direction, and to cause the polar contacts of relay $h^3$ to be closed in the reverse direction when switches $H^3$ and $H^{3a}$ are in their reverse position while relay $m^3$ is energized in the reverse direction. The control of a polarized switch indication relay $h^2$ by switches $H^2$ and $H^{2a}$ and by relay $m^2$ is similar to that of relay $h^3$ by switches $H^3$ and $H^{3a}$ and by relay $m^3$, and is therefore not shown in the drawings.

Each of the signals shown in the drawings operates a circuit controller having contacts which are closed when and only when their signal is indicating "stop." Such contacts are shown adjacent the signal diagrams in Fig. 1, and are designated by the reference numbers 29, 30, 31 and 36, respectively. Similar contacts, designated by the reference numbers 207, 209, 211, 212, 228, 230, 232 and 233, are shown adjacent the diagrams for signals S¹ and S⁴ in Figs. 9, 9ᴬ and 9ᴮ.

Contacts 31, 30 and 29, shown in Fig. 1 adjacent the diagrams for signals S¹, are operated by signals $S^{1a}$, $S^{1b}$, and $S^{1c}$, respectively, and are included in the control circuit for an approach locking relay designated by the reference character $P^{S1}$. Similar contacts 31, 30 and 29, shown adjacent the diagrams for signals S⁴ in Fig. 1, are operated by signals $S^{4a}$, $S^{4b}$ and $S^{4c}$, respectively, and are included in the control circuit for a second approach locking relay designated by the reference character $P^{S4}$. Similar contacts 36, operated by the signals $S^2$, $S^3$, $S^5$ and $S^6$, respectively, are included in the control circuits for stick locking relays $Q^{S2}$, $Q^{S3}$, $Q^{S5}$ and $Q^{S6}$, respectively.

Approach locking relay $P^{S1}$ becomes deenergized when the arm of any of the signals $S^1$ leaves its stop position. Relay $P^{S4}$ is similarly controlled by signals $S^4$. Each of these approach locking relays is also so controlled that, while a respective approach track relay is deenergized, the approach locking relay can again become energized only through a back contact of the track relay for an adjacent detector track section, or through a time releasing device contact which will become closed only upon the lapse of a measured interval of time after the beginning of the operation of the releasing device. These releasing devices may be of the well-known clockwork type, and are designated by the reference character J with distinguishing exponents.

Stick locking relay $Q^{S2}$ becomes deenergized when the arm of signal $S^2$ leaves its stop position. Relay $Q^{S2}$ can then again become energized only upon the deenergization of detector track section relay $T^5$, or upon the closing of contact 39 of a time relay $N^{S2}$ when signal $S^2$ is again indicating "stop". As here shown, time relay $N^{S2}$ is of the thermal type, comprising a heater winding 40, which, upon the lapse of a period of time after it has become energized, causes its contact 39 to close. Relays $Q^{S3}$, $Q^{S5}$ and $Q^{S6}$ are controlled similarly to relay $Q^{S2}$.

Each of the approach and stick locking relays P and Q, when deenergized, prevents the operation of each switch in a route governed by a signal which controls the corresponding relay P or Q, and enforces, at times, after a signal has been returned to its stop position, the lapse of a measured time interval before the switches in the route governed by the signal can again be operated.

In each of the drawings, the contacts operated by the various relays, or by the time releases J, or by other control devices which will be hereinafter described, are identified by numbers, such numbers having distinguishing exponents when the contacts are not shown adjacent the relay, release, or other device by which they are operated. The exponent for each of these contact numbers comprises the reference character and exponent for the respective relay, release, or other device. For example, the exponent $T^5$ for contact $37^{T5}$, shown in a pick-up circuit for relay $Q^{S2}$ in Fig. 1, comprises the reference character T and its exponent 5 for track relay $T^5$ which operates contact $37^{T5}$. Similarly, exponent $m^4$ for contact $11^{m4}$ in the operating circuit for mechanism $M^4$, comprises reference character $m$ and its exponent 4 for switch control relay $m^4$ which operates contact $11^{m4}$.

In Fig. 2, a combined track diagram and operating board is shown, on which manually operable devices, designated by the reference character K with distinguishing exponents, are disposed adjacent points A, B, C, D, E, F, G and $ii$. Adjacent points A and D, call-on control push buttons $U^1$ and $U^4$, respectively, are also shown.

As indicated by the drawings each of the devices K may be a lever having a normal position $n$, a reverse position $r$ to the right, and a reverse position $f$ to the left. Levers K operate contacts in the circuits of Figs. 3, 4 and 9 of the first form of apparatus shown in the drawings, or in the circuits of Figs. 3A, 4 and 9A of the second form of apparatus shown in the drawings.

For arranging the switches of each route in the positions required for the route, and for clearing the eastbound signal for the route, the leverman will place the lever for each end of the route and for an intermediate point G or $ii$ in its $r$ position. Similarly, for arranging the switches of each route and for clearing the westbound signal for the route, the leverman will place the lever for each end of the route and for intermediate point G or $ii$ in its $f$ position.

Levers are required for intermediate run-around points, such for example as G and $ii$, only if it is desired to arrange for more than one traffic route between any two of the route ends at points A, B, C, D, E and F. Levers for points G and $ii$ provide for so-called "run-around" moves over crossovers $ee$ and $ff$, thus permitting trains to go from point A to point E over route 1 with switches $H^2$ and $H^3$ in their normal positions, or over route 4 with switches $H^2$, $H^{2a}$, $H^3$ and $H^{3a}$ in their reverse positions. Trains may similarly go from point A to point F over either route 2 or 5.

When the levers, such for example as levers $K^G$ and $K^{ii}$, for the intermediate run-around points are not required, the contacts operated by these levers will be replaced by direct wire connections. The contacts which will be so replaced are contacts $100^{KG}$ and $94^{Kii}$, shown in the circuits in Fig. 3, and contacts $196^{KG}$ and $189^{Kii}$ shown in the circuits in Fig. 9.

On the operating board adjacent the representation of each switch H, are two indicators shown as electric lamps, one for each position of the corresponding switch. Each of these indicators is designated by the reference character $e$ with an exponent corresponding to the associated position of its switch, and is mounted in the representation of the route in which the switch is included in the associated position.

Fig. 3 shows a network of circuits controlled by levers K for controlling normal and reverse switch control relays which are designated by the reference characters X and R, respectively, with exponents corresponding to those for the switches which they control. When the levers K for any route are placed in either of their reverse positions, the normal or the reverse control relay for each switch in the corresponding route is controlled in series with the normal or the reverse control relay for each other switch in the same route. For example, when levers $K^1$, $K^{ii}$ and $K^6$ are reversed, switch control relays $X^2$, $X^3$ and $R^4$ are energized in series.

In Fig. 4, circuits are shown controlled by push button circuit controllers $U^1$ and $U^4$ and by levers $K^1$ and $K^4$, for call-on control relays $Z^{S1}$ and $Z^{S4}$ for controlling signals $S^{1c}$ and $S^{4c}$, respectively. Each of the push button contacts $234^{U1}$ and $237^{U4}$ is biased in a suitable manner to the normally open position shown in the drawings. This may be accomplished by the use of a coiled spring, such for example as spring 280, shown in Fig. 4, one end of which is attached to the movable arm of contact $234^{U1}$, and the other end of which is attached to a fixed portion 281 of push button circuit controller $U^1$.

Fig. 5 shows circuits for controlling indicators $e$ which are mounted on the operating board shown in Fig. 2. It will be noted that each of these circuits will be closed for energizing a corresponding indicator $e$ only if the detector track section for the corresponding switch is unoccupied, and only if the relays X or R for the switch is energized, and if the indication relay $h$ for the same switch is energized in correspondence with the relay X or R which is energized.

Fig. 6 shows route locking relays which are deenergized when corresponding signals are cleared, and which can again be energized only if given track sections are unoccupied.

Circuits are shown in Fig. 7 for controlling polarized switch control relays $m$. Each relay $m$ can be energized in the normal direction only if the corresponding relay X is energized and the corresponding relay R is deenergized. Each relay $m$ can be energized in a reverse direction only if the corresponding relay R is energized and the corresponding relay X is deenergized.

In Fig. 8, circuits are shown for controlling signal stick relays $L^{S1}$ and $L^{S4}$ which control, in part, signals $S^1$ and $S^4$, respectively.

Fig. 9 shows a signal control network comprising a plurality of interconnected signal control circuits each of which can be closed only if all the control levers for a corresponding route are in a reverse position required for the signal.

Fig. $1^A$ of the second form of apparatus embodying my invention shows a slow pickup relay $t^3$ controlled by a front contact of track relay $T^3$, and shows a pickup circuit for relay $T^3$ controlled by a back contact of relay $t^3$, and a stick circuit for relay $T^3$ controlled by one of its own front contacts. Relays $t^4$ and $T^4$ are shown controlled similarly to relays $t^3$ and $T^3$, respectively. A slow pickup relay, designated by the reference character $t$ with a corresponding exponent, is similarly controlled by each of the other detector track relays T, and is therefore not shown in Fig. $1^A$. Each of the other track relays T is controlled by its associated slow pickup relay $t$ similarly to the manner shown for relays $T^3$ and $T^4$, and is therefore not shown in Fig. $1^A$.

In Fig. $3^A$, the circuits of Fig. 3 are shown divided into two parts, and are modified to include contacts and the control windings of route stick relays which are designated by the reference character W with distinguishing exponents. One route stick relay W is associated with the lever for each route end, and two route stick relays W are associated with the lever for each of the intermediate points G and $ii$.

In Fig. $6^A$, the relay $V^{3w}$ is shown controlled by relays $t^3$ and $t^4$ in addition to the other relays by which it is controlled in Fig. 6. The other route locking relays V are similarly controlled by other relays $t$, and are therefore not shown in Fig. $6^A$.

In Fig. $7^A$, a portion of the circuits shown in Fig. 7 for relay $m^4$ is shown modified to include a contact of relay $t^4$. The other polarized switch control relays $m$ are to be similarly controlled by the relays $t$, which are associated with the track relays for the detector track sections in which the switches are located, and are therefore not shown in Fig. $7^A$.

Fig. $9^A$ shows the signal control network circuits of Fig. 9 modified on account of relays W.

In Fig. $2^B$ of the third form of apparatus embodying my invention, a group of three push button circuit controllers is provided instead of each lever K which is shown for a route end in Fig. 2. Each of these push button circuit controllers is designated by the reference character $k$ with an exponent which includes the letter L meaning left, or the letter R meaning right, or the letter N meaning normal. Instead of each of the intermediate levers $K^G$ and $K^{ii}$ of Fig. 2, only one push button $k$ is shown in Fig. $2^B$.

For arranging the track switches of each route in the positions required for the route and for clearing the eastbound signal for the route, the operator will depress the two push buttons for the route, which have the letter R in their exponents, and will depress the intermediate push button $K^G$ or $K^{ii}$ for the route. Similarly, for arranging the switches of each route and for clearing the westbound signal for the route, the operator will depress the two push buttons for the route, having the letter L in their exponents, and will also depress an intermediate push button $k$ for the route.

Two indicators $e$ are shown on the operating board in Fig. $2^B$ adjacent each group of three push buttons $k$, and also adjacent each intermediate push button $k$. Each of these indicators is given an exponent with the letter L or the letter R. When any route is arranged for an eastbound traffic movement, the indicators $e$ having an exponent R for the route will be energized. When any route is arranged for a westbound traffic movement, the indicators $e$ having an exponent L for the route will be energized.

Fig. $3^B$ shows route stick relays W similar to those which are shown in Fig. $3^A$, but also shows a route releasing stick relay designated by the reference character Y with a distinguishing exponent for each route end.

Each of the push button circuit controller contacts by which these relays are shown controlled is biased to the normally open or the normally closed position in which it is shown in the drawings. This may be done by any suitable means, such for example as a coiled spring 280 shown for contact $234^{U1}$ in Fig. 4.

Fig. $4^B$ shows circuits for call-on control relays $Z^{S1}$ and $Z^{S4}$, including stick circuits controlled by the corresponding relays Y.

Fig. $5^B$ shows the circuits for indicators $e$ of Fig. $2^B$ controlled by relays W and Y.

In Fig. $9^B$, the circuits of Fig. 9 are controlled by relays W and Y instead of by levers K as in Fig. 9.

Having described, in general, the arrangement and operation of various forms of apparatus embodying my invention, I will now trace in detail the operation of these forms of apparatus.

As shown in the drawings, all parts are in the normal condition, that is, each track relay T is energized; each lever K of Fig. 2 is in the normal position $n$; each push button $k$ of Fig. $2^B$ and each of the call-on push buttons $U^1$ and $U^4$ of Figs. 2 and $2^B$ is in its normal position in which it is shown in the drawings; the polar contacts of each switch relay $m$ are in their normal positions; each switch H is in its normal position in which it is shown in the drawings; the circuit controller $y$ for each switch H is in its normal position; each signal S is indicating "stop"; relays N, R, X, Z, $m$, W and Y are deenergized; and indicators $e$ are deenergized.

I will first trace the operation of the first form of apparatus, shown in Figs. 1 to 9, inclusive.

With the polar contacts of relay $m^4$ in their normal position, and with circuit controller $y^4$ in its normal position, current is supplied in the normal direction to relay $h^4$ by a circuit passing from terminal $x$ of a suitable source of current, not shown in the drawings, through contact $17^{m4}$ closed in its normal position, contact $18^a$—$18$ of circuit controller $y^4$, winding of relay $h^4$, and contact $19$—$19^a$ of circuit controller $y^4$ to terminal $o$ of the same source of current. Relay $h^4$ is therefore energized in the normal direction, and hence its contacts are in the normal position. Relay $h^1$ is similarly energized.

On account of switches $H^3$ and $H^{3a}$ being in their normal positions, and on account of the polar contacts of switch control relay $m^3$ being in the normal position, polarized indication relay $h^3$ is energized in the normal direction by a circuit passing from terminal $x$, through contact $21^{m3}$ shown to the left, contact $22^a$—$22$ of circuit controller $y^{3a}$, contact $23^a$—$23$ of circuit controller $y^3$, winding of relay $h^3$, contact $24$—$24^a$ of circuit controller $y^3$, and contract $25$—$25^a$ of circuit controller $y^{3a}$ to terminal $o$. Relay $h^2$ is similarly energized.

With signals $S^1$ indicating stop, approach locking relay $P^{S1}$ is energized by a pick-up circuit passing from terminal $x$, through contacts $29$, $30$ and $31$ of signals $S^{1c}$, $S^{1b}$ and $S^{1a}$, respectively, contact $32$ of relay $T^1$, and the winding of relay $P^{S1}$ to terminal $o$. A stick circuit is also closed for relay $P^{S1}$, and differs from the pick-up circuit, just traced, only, by including contact $35$ of relay $P^{S1}$ instead of contact $32$ of relay $T^1$. Approach locking relay $P^{S4}$ is energized by circuits which are similar to those just traced for relay $P^{S1}$.

With signal $S^2$ indicating "stop", stick locking relay $Q^{S2}$ is energized by its stick circuit passing from terminal $x$, through contact $36$ of signal $S^2$, contact $38$ of relay $Q^{S2}$, and the winding of relay $Q^{S2}$ to terminal $o$. Stick locking relays $Q^{S3}$, $Q^{S5}$, and $Q^{S6}$ are energized by circuits which are similar to the circuit just traced for relay $Q^{S2}$.

With all approach and stick locking relays $P$ and $Q$, respectively, energized, and with all track relays $T$ energized, all of the route locking relays $V$ are energized as shown in Fig. 6. For example, relay $V^{2ae}$ is energized by its pickup circuit passing from terminal $x$, through contacts $43^{QS3}$, $44^{QS2}$, contact $45^{PS1}$ in multiple with contact $46^{h2}$, contact $47^{T2}$ in multiple with contact $48^{h2}$, contacts $49^{T5}$ and $50^{T6}$, and the winding of relay $V^{2ae}$ to terminal $o$. A stick circuit is also closed for relay $V^{2ae}$, which includes the pickup circuit just traced as far as contacts $45^{PS1}$ and $46^{h2}$, and thence passes through contact $51$ of relay $V^{2ae}$, and the winding of relay $V^{2ae}$ to terminal $o$.

Each of the signal stick relays $L^{S1}$ and $L^{S4}$, shown in Fig. 8, is energized, both a pickup and a stick circuit for each of these relays being closed. The circuits for relay $L^{S1}$ are closed because certain track relays are energized, and because switches $H^2$ and $H^{2a}$ are in their normal position. The pickup circuit for relay $L^{S1}$ passes from terminal $x$, through contacts $74^{h2}$, $75^{T3}$, $76^{T4}$, $79^{T2}$, $80^{PS1}$, and the winding of relay $L^{S1}$ to terminal $o$. The stick circuit which is closed for relay $L^{S1}$ is the same as the pick-up circuit just traced, except that it includes contact $81$ of relay $L^{S1}$ instead of contact $80^{PS1}$. The pick-up and stick circuits for relay $L^{S4}$ are similar, respectively, to those just traced for relay $L^{S1}$, and will therefore be readily understood by reference to the drawings.

I will assume that the leverman desires to arrange for an east-bound traffic movement over route 1, from A to E. He will therefore place the levers $K^1$, $K^{ii}$, and $K^5$ in their $r$ positions, thereby completing a circuit for energizing relays $X^4$, $X^3$ and $X^2$, passing from terminal $x$, through contact $89^{K5}$, winding of relay $X^4$, contacts $90^{R4}$ and $93^{R3}$, winding of relay $X^3$, contact $94^{Kii}$, winding of relay $X^2$, and contacts $95^{R2}$ and $103^{K1}$ to terminal $o$.

With relay $X^2$ energized, a circuit will be completed for energizing indicator $e^{X2}$, passing from terminal $x$, through contacts $114^{h2}$, $115^{h2}$, $119^{X2}$ and $120^{T2}$, and indicator $e^{X2}$ to terminal $o$. With relays $X^3$ and $X^4$ energized, indicators $e^{X3}$ and $e^{X4}$ will be energized by circuits which are similar to the circuits just traced for indicator $e^{X2}$, and which can therefore be readily traced on the drawings.

Relay $X^2$, upon becoming energized, also completes a circuit for energizing polarized relay $m^2$ in the normal direction, passing from the positive terminal of a source of current which may be a battery $b^2$, through conductors $137$ and $137^a$, contacts $145^{R2}$, $147^{X2}$, $148^{V3w}$, $149^{V2aw}$, $150^{V2ae}$, $151^{PS1}$, $152^{T2}$, $153^{T6}$, winding of relay $m^2$, and conductor $169$ back to battery $b^2$. With relays $X^3$ and $X^4$ energized, relays $m^3$ and $m^4$ will be energized in the normal direction by circuits which are similar to the circuit just traced for relay $m^2$, and which can, therefore, be readily traced on the drawings.

With levers $K^1$, $K^{ii}$ and $K^5$ in their $r$ positions, and with relays $X^2$, $X^3$ and $X^4$ energized, a circuit is completed for clearing signal $S^{1a}$, passing from terminal $x$, through contacts $176^{QS5}$, $177^{K5}$, $178^{X4}$, $182^{h4}$, $183^{h4}$, front point of contact $184^{X3}$, contacts $185^{h3}$, $186^{h3}$, $187^{h3}$, $188^{h2}$, $189^{Kii}$, $200^{X2}$, $201^{K1}$, $202^{JS1}$, back points of contacts $203^{R2}$ and $204^{ZS1}$, contact $205^{LS1}$, back point of contact $206^{R4}$, contact $207$ of signal $S^{1b}$, and the mechanism of signal $S^{1a}$ to terminal $o$.

When the arm of signal $S^{1a}$ leaves its stop position, both the pickup and stick circuits previously traced for relay $P^{S1}$ are opened at contact $31$ of signal $S^{1a}$. With relay $P^{S1}$ thus deenergized, the pickup circuit previously traced for relay $L^{S1}$, shown in Fig. 8, is open at contact $80^{PS1}$, but the stick circuit for relay $L^{S1}$ continues closed, and hence relay $L^{S1}$ continues energized.

Upon the deenergization of relay $P^{S1}$, contact $45^{PS1}$ opens one path of the circuits for relay $V^{2ae}$, shown in Fig. 6, but relay $V^{2ae}$ continues energized by a second path through contact $46^{h2}$. Relay $P^{S1}$, upon becoming deenergized, opens at its contact $55^{PS1}$, the pickup and stick circuits for relay $V^{3e}$, causing relay $V^{3e}$ to become deenergized. With relay $V^{3e}$ deenergized, the circuits for relays $m^3$ and $m^4$ are open at contacts $158^{V3e}$ and $165^{V3e}$, respectively, thus making it impossible to supply current to these circuits which might cause relays $m^3$ and $m^4$ to become energized in the reverse direction. The circuit for relay $m^2$ is also now open at contact $151^{PS1}$ on account of relay $P^{S1}$ being deenergized.

With relay $P^{S1}$ deenergized, contact $222^{PS1}$, shown adjacent contact $201^{K1}$ of the circuit previously traced in Fig. 9 for signal $S^{1a}$, is open. Contact $222^{PS1}$ controls opposing signals $S^4$, $S^5$ and $S^6$.

An eastbound train approaching signal $S^{1a}$ after the route from A to E has been arranged as described, deenergizes approach track relay $T^1$ which then opens its contact $32$ in the pickup circuit traced for relay $P^{S1}$ which, however, is already open at contact $31$ of signal $S^{1a}$.

When the train passes signal $S^{1a}$, entering section A–$ii$, relay $T^2$ becomes deenergized. Relay $T^2$, upon becoming deenergized, opens its contact $120^{T2}$ in the circuit previously traced for indicator $e^{X2}$, thereby causing this indicator to become deenergized.

With relay $T^2$ deenergized, its contact $152^{T2}$ is open in the circuit traced for relay $m^2$ which, however, is already open because contact $151^{PS1}$ is open.

Contact $59^{T2}$ in one of the pickup circuits for relay $V^{3e}$ is also open. Relay $V^{3e}$ is, however, already deenergized because contact $55^{PS1}$ is open.

With relay $T^2$ deenergized, contact $79^{T2}$ opens the stick circuit for relay $L^{S1}$. Relay $L^{S1}$ being thus deenergized, will open its contact $205^{LS1}$ in the circuit traced for signal $S^{1a}$, and hence the arm of this signal will return to the stop position.

The arm of signal $S^{1a}$, upon again reaching its stop position, completes a second pickup circuit for relay $P^{S1}$, passing from terminal $x$, through contacts 29, 30, and 31 of signals $S^{1c}$, $S^{1b}$ and $S^{1a}$, respectively, contact 33 of relay $T^2$, and the winding of relay $P^{S1}$ to terminal $o$.

Although relay $P^{S1}$ now closes its front contacts in the circuits for relays $L^{S1}$, $V^{3e}$ and $m^2$, these relays are still deenergized because their circuits are open at contacts of relay $T^2$.

When the train moves out of section $a$—$A$, relay $T^1$ becomes energized, completing again the pickup circuit first traced for relay $P^{S1}$ through contact 32 of relay $T^1$.

When the train enters section $ii$—$jj$, relay $T^3$ will become deenergized, and hence its contact $129^{T3}$ will open and cause indicator $e^{X3}$ to become deenergized. As long as the train is in section $ii$—$jj$, relay $T^3$ will remain deenergized, and, hence its contacts $75^{T3}$, $61^{T3}$ and $161^{T3}$ will prevent relays $L^{S1}$, $V^{3e}$ and $m^3$, respectively, from becoming energized.

When the train moves out of section $A$—$ii$, relay $T^2$ will again become energized, causing indicator $e^{X2}$ to again become energized by its circuit previously traced.

When the train enters section $jj$—$E$, relay $T^4$ will become deenergized, and hence indicator $e^{X4}$ will become deenergized on account of its circuit being opened at contact $132^{T4}$.

When the train leaves section $ii$—$jj$, permitting relay $T^3$ to again become energized, indicator $e^{X3}$ will again become energized on account of the closing of contact $129^{T3}$. Relay $T^3$, upon becoming energized, permits relay $V^{3e}$ to again become energized by its pickup circuit passing from terminal $x$, through contact $55^{PS1}$, contact $57^{V3ae}$ in multiple with contact $58^{h3}$, contacts $59^{T2}$ and $61^{T3}$, and the winding of relay $V^{3e}$ to terminal $o$.

While the train is in section $jj$—$E$, causing relay $T^4$ to be deenergized, contact $76^{T4}$ will be open and will thus prevent relay $L^{S1}$ from becoming energized. When the train leaves section $jj$—$E$, relay $T^4$, upon becoming energized, causes relay $L^{S1}$ to again become energized by its pickup circuit previously traced. Relay $T^4$, upon becoming energized, also closes its contact $132^{T4}$ and hence indicator $e^{X4}$ will again become energized by its circuit previously described.

In order to manually restore signal $S^{1a}$ to its stop position after it has been cleared, the leverman can return any one of the three levers $K^1$, $K^{ii}$ and $K^5$ to its normal position, thereby opening one of the contacts $201^{K1}$, $189^{Kii}$ and $177^{K5}$, respectively, in the circuit previously traced for the mechanism of signal $S^{1a}$.

If, after the leverman has arranged a route such, for example, as the route from A to E as previously described, a train has entered the route and it is then desired to provide a call-on signal indication to authorize a second train to enter the route while it is still occupied by the first train, the leverman will let the levers $K^1$, $K^{ii}$ and $K^5$ remain in their $r$ positions, and will depress call-on push button $U^1$, thereby causing relay $Z^{S1}$ to become energized by its pick-up circuit passing from terminal $x$, through contact $234^{U1}$, and the winding of relay $Z^{S1}$ to terminal $o$. With lever $K^1$ in its $r$ position, relay $Z^{S1}$ will be retained in its energized condition by its stick circuit passing from terminal $x$, through contact $235^{K1}$, contact 236 of relay $Z^{S1}$, and the winding of relay $Z^{S1}$ to terminal $o$. With relay $Z^{S1}$ energized, a circuit is now completed for signal $S^{1c}$ which is the same as the circuit previously traced for signal $S^{1a}$ as far as contact $203^{R2}$, and thence passing through the front point of contact $204^{ZS1}$, contacts 211 and 212 of signals $S^{1a}$ and $S^{1b}$, respectively, and the mechanism of signal $S^{1c}$ to terminal $o$. The arm of signal $S^{1c}$ thereupon moves to its call-on position.

Since the circuit just traced for signal $S^{1c}$ does not include a contact of stick relay $L^{S1}$, the arm of signal $S^{1c}$ will continue to indicate "call-on" while the route is occupied by a train. In order to restore the arm of signal $S^{1c}$ to its stop position, the leverman will return lever $K^1$ to its $n$ position, thereby opening contact $235^{K1}$ in the stick circuit for relay $Z^{S1}$, and thus causing relay $Z^{S1}$ to become deenergized.

I will now assume that, with all parts of the apparatus again in their normal condition as previously described, the leverman again arranges the switches of route 1 and clears signal $S^{1a}$, by placing levers $K^1$, $K^{ii}$ and $K^5$ in their $r$ positions. If now before an eastbound train enters section $a$—$A$, the leverman should desire to arrange for a traffic movement over some other route beginning at point A such, for example, as route 2 from A to F, he will place lever $K^6$ at its $r$ position, and will permit levers $K^1$ and $K^{ii}$ to remain in their $r$ positions.

However, as long as lever $K^5$ remains in its $r$ position, the circuit previously traced through contacts $89^{K5}$, $94^{Kii}$ and $103^{K1}$ will remain closed, and hence relay $X^4$ will remain energized. As long as relay $X^4$ is energized, the route circuit controlled by contact $91^{K6}$ will remain open at contact $92^{X4}$. With levers $K^1$, $K^{ii}$ and $K^5$ in their $r$ positions, and with relays $X^2$, $X^3$ and $X^4$ energized, the circuit for the mechanism of signal $S^{1a}$ will remain closed, and hence signal $S^{1a}$ will continue to indicate "proceed".

The leverman must therefore return lever $K^5$ to its $n$ position, thereby deenergizing relay $X^4$ and so causing a circuit to be completed for energizing relays $X^2$, $X^3$ and $R^4$ in series, passing from terminal $x$, through contact $91^{K6}$, winding of relay $R^4$, contacts $92^{X4}$ and $93^{R3}$, winding of relay $X^3$, contact $94^{Kii}$, winding of relay $X^2$, and contacts $95^{R2}$ and $103^{K1}$ to terminal $o$. With relays $X^2$ and $X^3$ thus energized, indicators $e^{X2}$ and $e^{X3}$ will again become energized as previously described. With relay $R^4$ energized, contact $135^{R4}$ will be closed in the circuit for energizing indicator $e^{R4}$ which, however, will be open at contact $134^{h4}$ until switch $H^4$ responds to the energization of relay $R^4$.

The energization of relay $R^4$ causes a circuit to be completed for energizing relay $m^4$ in the reverse direction, passing from the positive terminal of battery $b^3$, through conductor 169, winding of relay $m^4$, contacts $168^{T4}$, $167^{QS6}$, $166^{QS5}$, $165^{V3e}$, back point of contact $164^{X4}$, and contact $175^{R4}$ back to battery $b^3$. With relay $m^4$ energized in the reverse direction, switch mechanism $M^4$ will be supplied with current for moving switch H⁴ to its reverse position, such current passing from battery b¹, through contact 11^m4 closed in the reverse position, mechanism M⁴, and contact 15^m4 closed in the reverse position back to battery b¹.

Upon the reversal of the polar contacts of relay m⁴, terminal x is disconnected from indication relay h⁴ and a shunt circuit is completed for relay h⁴, passing from contact 20^m4 closed in the reverse position, through contact 18ª—18 of circuit controller y⁴, the winding of relay h⁴, and contact 19—19ª of circuit controller y⁴ back to contact 20^m4. During the movement of switch H⁴ from its normal to its reverse position, indication relay h⁴ is shunted by a second circuit including contacts 18—18ᶜ and 19ᶜ—19 of circuit controller y⁴. Upon the completion of the operation of switch H⁴ to its reverse position, relay h⁴ becomes energized in the reverse direction by a circuit passing from terminal x, through contact 17^m4 closed in the reverse position, contact 19ᵇ—19 of circuit controller y⁴, winding of relay h⁴, and contact 18—18ᵇ of circuit controller y⁴ to terminal o. Upon the energization of relay h⁴ in the reverse direction, contact 134^h4 will close the circuit for indicator e^R4, and hence this indicator will now become energized.

Relay h⁴, upon becoming energized in the reverse direction, also completes a circuit for operating the mechanism of signal S^1b, passing from terminal x, through contacts 179^QS6, 180^K6 and 181^R4, contact 182^h4 in the right-hand position, contact 183^h4, front point of contact 184^X3, contacts 185^h3, 186^h3, 187^h2, 188^h2, 189^Kii, 200^X2, contact 201^K1 in the right-hand position, contact 202^JS1, back points of contacts 203^R2 and 204^ZS1, contact 205^LS1, front point of contact 206^R4, contact 208^X4, contact 209 of signal S^1a, and the mechanism of signal S^1b to terminal o.

I will now assume that the leverman desires to again arrange route 1 for a traffic movement from A to E. He will therefore return lever K⁶ to its n position, but will permit levers K¹ and K^ii to remain in their r positions, and will place lever K⁵ in its r position, thereby again completing the circuit previously traced for energizing relays X², X³ and X⁴ in series. With relays X² and X³ energized, indicators e^X2 and e^X3 will be energized as previously described. With relay X⁴ energized, contact 136^X4 will be closed in the circuit for indicator e^X4, but this circuit will now be open at contact 134^h4 until switch H⁴ responds to the energization of relay X⁴ by returning to its normal position.

On account of relay X⁴ being energized, relay m⁴ is now again energized in the normal direction. With relay m⁴ energized in the normal direction, a circuit will be completed for mechanism M⁴, passing from the positive terminal of battery b¹, through contact 15^m4 in its left-hand position, mechanism M⁴, and contact 11^m4 in its left-hand position back to battery b¹. Mechanism M⁴ will, therefore, now return switch H⁴ to its normal position, after which signal S^1a will be cleared by its circuit previously traced.

I will next assume that while route 1 is arranged for a traffic movement from A to E, and while signal S^1a is indicating "proceed", the operator, by mistake, attempts to arrange for a traffic movement over route 8 from B to F. He will, therefore, place levers K², K^G and K⁶ in their r positions for energizing relays X¹, X^2a, R³ and R⁴ in series. With relays X³ and X⁴ energized for arranging route 1 from A to E, the circuit for arranging route 8 will be open at contacts 96^X3 and 92^X4, and hence none of the relays X¹, X^2a, R³ and R⁴ can be energized. With levers K¹, K^ii and K⁵ still in their r positions, and with relays X², X³ and X⁴ still energized, the circuit for signal S^1a will still be closed and this signal will continue to indicate "proceed".

From the two examples of operation which I have just given, it follows that, after the apparatus has been put into condition for arranging a given route, the leverman cannot by mistake put the signal for the given route to "stop", nor arrange the switches of a conflicting route while the control apparatus is still in condition for arranging the given route, although no mechanical interlocking is provided for control levers K.

I will assume that all parts of the apparatus have again been returned to their normal condition, and that the operator has again arranged route 1 for a traffic movement from A to E and cleared signal S^1a. If, now, after an east-bound train enters section a—A, deenergizing relay T¹, the operator should desire to send this train over some other route than route 1, such, for example, as route 3 from A to D, he can return lever K⁵ to its normal position, thereby opening the circuit for relays X², X³ and X⁴ at contact 89^K5. With lever K⁵ returned to its normal position, contact 177^K5 will be open in the circuit for signal S^1a, and hence the arm of signal S^1a will return to the stop position.

On account of relay T¹ being deenergized by the train in section a—A, relay P^S1 will not pick up when the arm of signal S^1a is returned to its stop position. In order to energize relay P^S1, the leverman will start the operation of time release J^S1. Contact 202^JS1 in the circuit for signal S^1a, shown in Fig. 9, will immediately open and, after the lapse of a measured period of time, contact 34 of release J^S1 will close, causing relay P^S1 to become energized by a third pickup circuit, passing from terminal x, through contacts 29, 30 and 31 of signals S^1c, S^1b and S^1a, respectively, contact 34 of release J^S1, and the winding of relay P^S1 to terminal o.

With relay P^S1 energized, relay V^3e will become energized by its pickup circuit previously traced, and hence the leverman can now proceed to arrange any other route originating at point A, but neither signal S^1b nor S^1c can be operated to the proceed position for governing movements over such a route until the leverman restores the contacts of release J^S1 to their normal position.

In order to send the train over route 3 from A to D, the operator will place levers K^G and K⁴ in their r positions, and will also place lever K¹ in its r position if it is not already in that position. A circuit will thereby be completed for energizing relays R² and X^3a, passing from terminal x, through contacts 98^K4 and 99^R3, winding of relay X^3a, contact 100^KG, winding of relay R², contacts 101^X2a and 102^X2, and contact 103^K1 in its right-hand position to terminal o.

With relay R² energized, switches H² and H^2a will be operated to their reverse positions, and signal S^1c will then be cleared by its circuit passing from terminal x, through contacts 191^PS4, 192^K4, 193^X3a, 194^h3, 196^KG, 197^h2, 198^h2, in its right-hand position, 199^R2, 200^X2, 201^K1, 202^JS1, front point of contact 203^R2, contact 210^X2, contacts 211 and 212 of signals S^1a and S^1b, respectively, and the mechanism of signal S^1c to terminal o.

I will next assume that the operator has again returned the apparatus to the normal condition, and that he then desires to send a train by the run-around path from A to E over switches H², H²ᵃ, H³ᵃ and H³ reversed. He will therefore place levers K¹, K⁶ and K⁵ in their right reverse positions $r$, thereby completing a circuit passing from terminal $x$, through contact 89$^{K5}$, winding of relay X⁴, contacts 90$^{R4}$, 96$^{X3}$, 97$^{X3a}$, winding of relay R³, contact 100$^{KG}$, the winding of relay R², contacts 101$^{X2a}$, and 102$^{X2}$, and contact 103$^{K1}$ in the right-hand position to terminal $o$.

With relays R² and R³ energized, switches H², H²ᵃ, H³ᵃ and H³ will be operated to their reverse positions. With these switches in their reverse positions, a circuit will be completed for the mechanism of signal S$^{1c}$, passing from terminal $x$, through contacts 176$^{QS5}$, 177$^{K5}$, 178$^{X4}$, 182$^{h4}$, 183$^{h4}$, back point of contact 184$^{X3}$, contacts 190$^{R3}$, 194$^{h3}$, 195$^{h3}$, 196$^{KG}$ and 197$^{h2}$, contact 198$^{h2}$ in its right-hand position, contacts 199$^{R2}$, 200$^{X2}$, 201$^{K1}$ in its right-hand position, contact 202$^{JS1}$, front point of contact 203$^{R2}$, contact 210$^{X2}$, contacts 211 and 212 of signals S$^{1a}$ and S$^{1b}$, respectively, and the mechanism of signal S$^{1c}$ to terminal $o$.

I will assume that the apparatus has again been returned to its normal condition, and that the leverman desires to send a train over route 1 in the westbound direction from E to A. He will therefore place levers K¹, K$^{ii}$ and K⁵ in their left reverse positions $f$, causing a circuit to be completed for energizing relays X², X³ and X⁴ in series, passing from terminal $x$, through contacts 103$^{K1}$ and 95$^{R2}$, winding of relay X², contact 94$^{Kii}$, winding of relay X³, contacts 93$^{R3}$ and 90$^{R4}$, winding of relay X⁴ and contact 89$^{K5}$ in its left-hand position to terminal $o$. With levers K¹, K$^{ii}$ and K⁵ in their left reverse positions and with relays X², X³ and X⁴ energized, a circuit will be completed for the mechanism of signal S⁵, passing from terminal $x$, through contacts 222$^{PS1}$ and 201$^{K1}$, front point of contact 200$^{X2}$, contacts 189$^{Kii}$, 188$^{h2}$, 187$^{h2}$, 186$^{h3}$, 185$^{h3}$, front point of contact 184$^{X3}$, contacts 183$^{h4}$, 182$^{h4}$, and 178$^{X4}$, contact 177$^{K5}$ in its left reverse position, and the mechanism of signal S⁵ to terminal $o$.

I will now trace the operation of the second form of apparatus shown in the drawings comprising Figs. 1^A, 2, 3^A, 4, 5, 6^A, 7^A, 8 and 9^A.

As shown in the drawings, all parts of the second form of apparatus embodying my invention are in the normal condition. I will now assume that with all parts thus in the normal condition, the operator desires to arrange for a traffic movement over route 1 from A to E. He will therefore place levers K¹, K$^{ii}$ and K⁵ in their $r$ positions. With levers K¹ and K$^{ii}$ in their $r$ positions, a circuit will be completed for energizing relays W$^{iiR}$ and X² in series, passing from terminal $x$, through the winding of relay W$^{iiR}$, contacts 249$^{Kii}$, and 251$^{WiiL}$, winding of relay X², contact 95$^{R2}$, contact 103$^{K1}$, in its right-hand position, and contact 247$^{W1}$ to terminal $o$. Relay W$^{iiR}$, upon becoming energized by the circuit just traced, closes its contact 248 in multiple with contact 249$^{Kii}$.

With lever K⁵ in its $r$ position, and with relay W$^{iiR}$ energized, a circuit will be completed for energizing relays W⁵, X⁴ and X³ in series, passing from terminal $x$, through the winding of relay W⁵, contact 89$^{K5}$ in its right-hand position, winding of relay X⁴, contacts 90$^{R4}$ and 93$^{R3}$, winding of relay X³, and front point of contact 251 of relay W$^{iiR}$ to terminal $o$. Relay W⁵, upon becoming energized, closes its own contact 246 in multiple with contact 89$^{K5}$.

With relays W$^{iiR}$, W⁵, X², X³ and X⁴ energized, a circuit will be completed for the mechanism of signal S$^{1a}$, passing from terminal $x$, through contacts 176$^{QS5}$, 253$^{W5}$, 178$^{X4}$, 182$^{h4}$, 183$^{h4}$, front point of contact 184$^{X3}$, contacts 185$^{h3}$, 186$^{h3}$, 187$^{h2}$, 188$^{h2}$, 252$^{WiiR}$, front point of contact 200$^{X2}$, back point of contact 253$^{W1}$, contacts 254$^{K1}$, 202$^{JS1}$, back points of contacts 203$^{R2}$ and 204$^{ZS1}$, contact 205$^{LS1}$, back point of contact 206$^{R4}$, contact 207 of signal S$^{1b}$, and the mechanism of signal S$^{1a}$ to terminal $o$.

I will now assume that with the switches H², H³ and H⁴ arranged for a traffic movement over route 1 from A to E, and with signal S$^{1a}$ indicating "proceed," the leverman, by mistake, attempts to arrange for a traffic movement over route 2 from A to F by placing lever K⁶ in its $r$ position. On account of relay X⁴ being energized by the circuit previously traced, the circuit for relays W⁶ and R⁴ will be open at contact 92$^{X4}$, and hence the placing of lever K⁶ in its $r$ position will have no effect on switch H⁴ nor on either of the other switches of route 1.

If the operator should, by mistake, change the position of lever K⁵ while attempting to arrange some other route while signal S$^{1a}$ is indicating "proceed" for a traffic movement over route 1 from A to E, such an operation of lever K⁵ will have no effect since relay W⁵ is now energized by its stick circuit. Also, any change in the position of lever K$^{ii}$ would have no effect on relay W$^{iiR}$ since this relay is now energized by its stick circuit.

If, however, the operator should change the position of lever K¹, he would thereby open contact 103$^{K1}$ in its right-hand position, causing relays W$^{iiR}$ and X² to become deenergized. Relay W$^{iiR}$, upon becoming deenergized, drops its contact 251, thereby breaking the circuit previously traced for relays W⁵, X⁴ and X³, and causing these relays to also become deenergized.

It follows that, after the operator has once placed levers K¹, K$^{ii}$ and K⁵ in their $r$ positions for arranging the switches of route 1 and for clearing signal S$^{1a}$, this route cannot be disturbed except by a change in the position of lever K¹. Similarly, if the switches of any other route are arranged in the position required for that other route, and if the signal for the route has been cleared, no change can be made in the positions of the switches, nor can the signal be changed by any other lever K than the lever for the route end at which the signal is located.

I will next assume that all parts of the apparatus are again in their normal condition, and that the operator then desires to arrange for a traffic movement in the opposite direction over route 1 from E to A.

He will therefore place levers K¹, K$^{ii}$ and K⁵ in their $f$ positions. With levers K$^{ii}$ and K⁵ in their $f$ positions, a circuit will be completed for energizing relays W$^{iiL}$, X³ and X⁴ in series, passing from terminal $x$, through the winding of relay W$^{iiL}$, contact 250$^{Kii}$, contact 251 of relay W$^{iiR}$, winding of relay X³, contacts 93$^{R3}$ and 90$^{R4}$, winding of relay X⁴, contact 89$^{K5}$ in the left-hand position, and contact 247$^{W5}$ to terminal $o$. Relay W$^{iiL}$, upon becoming energized, closes its contact 249 in multiple with contact 250$^{Kii}$. With lever K¹ in its $f$ position, and with relay W$^{iiL}$ now energized, a circuit will be completed for energizing relays W¹ and X² in series, passing from terminal $x$, through the winding of relay W¹, contact 103$^{K1}$ in its left-hand position, contact 95$^{R2}$, winding of relay X², and the front point of contact 251$^{WiiL}$ to terminal $o$. Relay W¹, upon becoming energized, closes its contact 246 in multiple with contact 103$^{K1}$.

With relays W$^{iiL}$, W$^1$, X$^2$, X$^3$ and X$^4$ thus energized, a circuit will be completed for the mechanism of signal S$^5$, passing from terminal $x$, through contacts 222$^{PS1}$, 253$^{W1}$, front point of contact 200$^{X2}$, contacts 252$^{WiiL}$, 188$^{h2}$, 187$^{h2}$, 186$^{h3}$, 185$^{h3}$, front point of contact 184$^{X3}$, contacts 183$^{h4}$, 182$^{h4}$, 178$^{X4}$, back point of contact 253$^{W5}$, contact 254$^{K5}$, and the mechanism of signal S$^5$ to terminal $o$.

If now a westbound train enters section $jj$—E, relay T$^4$ will become deenergized, causing relay $t^4$, shown in Fig. 1$^A$, to also become deenergized. If, due to rust on the rails or to some other cause, there should be a momentary loss of shunt, permitting relay T$^4$ to become energized by its pick-up circuit which includes contact 242 of relay $t^4$, a circuit controlled by contact 241 of relay T$^4$ for energizing relay $t^4$ would become closed. Relay $t^4$ is, however of the type having a slow pick-up, and therefore a brief period of time will elapse before relay $t^4$ will close its front contacts. During this interval, the momentary loss of shunt will have passed, and relay T$^4$ will again be deenergized.

By observing the circuits shown in Figs. 6$^A$ and 7$^A$, it will be noted that during the time that relay T$^4$ has been energized on account of the momentary loss of shunt, the pick-up circuit for relay V$^{3w}$ is held open on account of contact 243$^{t4}$ being open, and the circuit for relay $m^4$ is held open on account of contact 245$^{t4}$ being open. Relay $t^4$ therefore prevents false release of relays V$^{3w}$ and $m^4$ in the event of a momentary loss of shunt which permits relay T$^4$ to become energized for a brief period of time.

When the train leaves section $jj$—E, relay T$^4$ becomes energized by its pick-up circuit which includes contact 242 of relay $t^4$. Relay T$^4$, upon becoming energized, closes its own contact 240 in multiple with contact 242 of relay $t^4$.

I will next trace the operation of the third form of apparatus comprising the parts shown in Figs. 1, 2$^B$, 3$^B$, 4$^B$, 5$^B$, 6, 7, 8 and 9$^B$.

As shown in the drawings, all parts of the third form of apparatus embodying my invention are in the normal condition. I will now assume that with all parts thus in the normal condition, the operator desires to arrange for a traffic movement over route 1 from A to E. He will therefore depress push buttons $k^{1R}$, $k^{ii}$ and $k^{5R}$. Push button $k^{1R}$, upon being depressed, completes a circuit for energizing relay Y$^1$, passing from terminal $x$, through contacts 255$^{k1R}$ and 256$^{W1}$, and the winding of relay Y$^1$ to terminal $o$. Relay Y$^1$, upon becoming energized, completes its stick circuit passing from terminal $x$, through contacts 257$^{T2}$ and 259$^{k1N}$, contact 260 of relay Y$^1$, and the winding of relay Y$^1$ to terminal $o$.

Push button $k^{ii}$, upon being depressed, closes its contact 261$^{kii}$, and hence, with relay Y$^1$ energized, a circuit will be completed for energizing relays W$^{iiR}$ and X$^2$ in series, passing from terminal $x$, through contact 261$^{kii}$, winding of relay W$^{iiR}$, contact 263 of relay W$^{iiL}$, winding of relay X$^2$, contact 95$^{R2}$, and contact 264 of relay Y$^1$ to terminal $o$. Relay W$^{iiR}$, upon becoming energized, closes its contact 262 in multiple with contact 261$^{kii}$.

Push button $k^{5R}$, upon being depressed, closes its contact 265$^{k5R}$, and hence, with relay W$^{iiR}$ energized by the circuit just traced, a circuit will be completed for energizing relays W$^5$, X$^4$ and X$^3$, passing from terminal $x$, through contact 265$^{k5R}$, winding of relay W$^5$, contact 267 of relay Y$^5$, winding of relay X$^4$, contacts 90$^{R4}$ and 93$^{R3}$, winding of relay X$^3$, and contact 268 of relay W$^{iiR}$ to terminal $o$. Relay W$^5$, upon becoming energized, closes its contact 266 in multiple with contact 265$^{k5R}$.

With relay Y$^1$ energized, indicator $e^{1R}$ is energized by its circuit passing from terminal $x$, through contact 273$^{Y1}$, and indicator $e^{1R}$ to terminal $o$. With relay W$^{iiR}$ energized, indicator $e^{iiR}$ is likewise energized by its circuit which includes contact 275$^{WiiR}$. With relay W$^5$ energized, indicator $e^{5R}$ will be energized by its circuit which includes contact 272$^{W5}$. With indicators $e^{1R}$, $e^{iiR}$ and $e^{5R}$ energized, the operator can see at a glance that the control apparatus is in condition for arranging the switches of route 1 and for clearing signal S$^{1a}$.

Indicators $e$, shown in Fig. 5$^B$, therefore serve the purpose of informing the operator as to the condition of the apparatus directly controlled by push buttons $k$. Such indicators are not needed for the apparatus of the first two forms shown in the accompanying drawings since levers K are not biased to any given position, and hence the positions of the levers will indicate to the operator the condition of the control apparatus.

After the switches H$^2$, H$^3$ and H$^4$ have been operated to their normal positions if they are not already in those positions, the energization of relays Y$^1$, X$^2$, W$^{iiR}$, X$^3$, X$^4$, and W$^5$ will complete a circuit for the mechanism of signal S$^{1a}$, passing from terminal $x$ through contacts 176$^{QS5}$, 276$^{W5}$, 277$^{Y5}$, 178$^{X4}$, 182$^{h4}$, 183$^{h4}$, front point of contact 184$^{X3}$, contacts 185$^{h3}$, 186$^{h3}$, 187$^{h2}$, 188$^{h2}$, 278$^{WiiR}$, 200$^{X2}$, front point of contact 277$^{Y1}$, contacts 279$^{W1}$, 202$^{JS1}$, back points of contacts 203$^{R2}$ and 204$^{ZS1}$, contact 205$^{LS1}$, back point of contact 206$^{R4}$, contact 207 of signal S$^{1b}$, and the mechanism of signal S$^{1a}$ to terminal $o$. The arm of signal S$^{1a}$ will therefore now display the proceed indication.

With relay W$^5$ energized, the pickup circuit for relay Y$^5$ is open at contact 256$^{W5}$, and the operator cannot energize relay Y$^5$ by depressing push button $k^{5L}$, and hence such an operation of push button $k^{5L}$ has no effect on the condition of relay W$^5$. With relay W$^{iiR}$ energized, the pickup circuit for relay W$^{iiL}$ is open at contact 263 of relay W$^{iiR}$, and hence the operator cannot energize relay W$^{iiL}$ by depressing push button $k^{ii}$. Any operation of push button $k^{ii}$ will therefore not cause relay W$^{iiR}$ to be deenergized.

If, however, the operator should depress push button $k^{1N}$, he will open the stick circuit for relay Y$^1$ at contact 259$^{k1N}$. Such deenergization of relay Y$^1$ will cause its contact 264 to open the circuit for relays X$^2$ and W$^{iiR}$. Relay W$^{iiR}$, being thus deenergized, will open at its contact 268, the circuit for relays W$^5$, X$^4$ and X$^3$, causing these relays to also become deenergized. Since each of the other routes is similarly controlled, it follows that after the switches of any route have been arranged in the positions required for the route and a signal has been cleared for governing traffic movements over the route, the operator can make no change in the route except by depressing the normal push button for the route end at which the signal is located.

A train, upon entering any of the routes in response to the clearing of a signal for the same route, will also open the stick circuit for the relay Y for the route, thereby causing the route stick relays and the switch control relays to be deenergized similarly to the manner described when the operator depresses the normal push button for the route end at which the signal is located. If, for example, route 1 has been arranged and signal $S^{1a}$ is indicating "proceed", a train, upon passing signal $S^{1a}$, wil deenergize relay $T^2$ which will thereupon open its contact $257^{T2}$ in the stick circuit for relay $Y^1$, which, upon becoming deenergized, causes relays $X^2$, $W^{iiR}$, $X^3$, $X^4$ and $W^5$ to become deenergized.

I will now assume that while the train is still occupying route 1, the operator desires a second train to follow the first train into route 1. He will therefore depress push buttons $k^{1R}$ and $U^1$ contemporaneously. Push button $k^{1R}$, upon being depressed, will close the pickup circuit previously traced for relay $Y^1$, and push button $U^1$, upon being depressed, will close a pickup circuit for relay $Z^{S1}$, including contact $234^{U1}$. With relay $Z^{S1}$ energized, a second stick circuit will be completed for relay $Y^1$, which is the same as the stick circuit previously traced except that it includes contact $258^{ZS1}$ instead of contact $257^{T2}$. With relay $Y^1$ energized, a stick circuit is completed for relay $Z^{S1}$, passing from terminal $x$, through contact $271^{Y1}$, contact $236$ of relay $Z^{S1}$, and the winding of realy $Z^{S1}$ to terminal $o$. Relays $Y^1$ and $Z^{S1}$ will therefore continue energized by their stick circuits after push buttons $k^{1R}$ and $U^1$ have returned to their normal positions. The operator will now depress push buttons $K^{ii}$ and $K^5$, which, with relay $Y^1$ energized, will cause relays $W^{iiR}$, $W^5$, $X^2$, $X^3$ and $X^4$ to again become energized.

With these relays and relay $Z^{S1}$ energized, a circuit is completed for causing signal $S^{1c}$ to display the call-on indication. This circuit is the same as the circuit previously traced for signal $S^{1a}$ as far as the back point of contact $203^{R2}$, and thence passes through the front point of contact $204^{ZS1}$, contacts $211$ and $212$ of signals $S^{1a}$ and $S^{1b}$, respectively, and the mechanism of signal $S^{1c}$ to terminal $o$. With the apparatus thus arranged for causing the call-on indication to be displayed by signal $S^{1c}$, relay $Y^1$ cannot be deenergized by a train, and can only be deenergized by the operator depressing push button $k^{1n}$ and thereby opening contact $259^{k1n}$ in the stick circuit for relay $Y^1$.

I will next assume that the apparatus has been returned to the normal condition and that the operator then desires to send a train over route 5 from F to A. He will therefore depress push buttons $k^{6L}$, $k^G$ and $k^{1L}$. Push button $k^{6L}$, upon being depressed, completes, at its contact $255^{k6L}$, a pickup circuit for relay $Y^6$, passing from terminal $x$, through contacts $255^{k6L}$ and $256^{W6}$, and the winding of relay $Y^6$ to terminal $o$. Relay $Y^6$, upon becoming energized, completes its stick circuit passing from terminal $x$, through contacts $270^{T4}$ and $259^{k6N}$, contact $260$ of relay $Y^6$, and the winding of relay $Y^6$ to terminal $o$.

With relay $Y^6$ energized, and with push button $k^G$ depressed, a circuit will be completed for energizing relays $W^{GL}$, $R^3$ and $R^4$ in series, passing from terminal $x$, through contact $269^{kG}$, winding of relay $W^{GL}$, contact $263$ of relay $W^{GR}$, winding of relay $R^3$, contacts $97^{X3a}$, $96^{X3}$ and $92^{X4}$, winding of relay $R^4$, and contact $264$ of relay $Y^6$ to terminal $o$. Relay $W^{GL}$, upon becoming energized, closes its contact $262$ in multiple with contact $269^{kG}$.

With relay $W^{GL}$ energized, and with push button $k^{1L}$ depressed, a circuit will be completed for energizing relays $W^1$ and $R^2$ in series, passing from terminal $x$, through contact $265^{K1L}$, winding of relay $W^1$, contact $267$ of relay $Y^1$, contacts $102^{X2}$ and $101^{X2a}$, winding of relay $R^2$, and contact $268$ of relay $W^{GL}$ to terminal $o$. Relay $W^1$, upon becoming energized, closes its contact $266$ in multiple with contact $265^{k1L}$.

With relays $W^1$, $R^2$, $W^{GL}$, $R^3$, $R^4$ and $Y^6$ energized, a circuit will be completed for the mechanism of signal $S^6$ when the switches have been arranged to correspond with the energized condition of the relays X and R, this circuit passing from terminal $x$, through contacts $222^{PS1}$, $276^{W1}$, $277^{Y1}$, back point of contact $200^{X2}$, contacts $199^{R2}$, $198^{h2}$, $197^{h2}$, $278^{WGL}$, $195^{h3}$, $194^{h3}$ in its right-hand position, $190^{R3}$, $184^{X3}$, $183^{h4}$, $182^{h4}$ in its right-hand position $181^{R4}$, front point of contact $277^{Y6}$, contact $279^{W6}$, and the mechanism of signal $S^6$ to terminal $o$.

I have described, for a few typical traffic movements the operation of each of three forms of apparatus embodying my invention. From those descriptions of operation, and from the preceding general description, operation of each of the three forms of apparatus for every other possible traffic movement will be readily understood by reference to the drawings.

Apparatus of each of the three forms embodying my invention is shown for a layout including switches which can be arranged for eleven different routes. Traffic movements can be made in either direction over each of these routes.

In each of the first two forms of apparatus shown in the accompanying drawings, a manually operable control lever is provided for each route end or signal location. Control levers are also provided for points intermediate the opposing signals in order to control run-around moves. Each route for which an intermediate lever is provided may be considered as being divided into two sub-routes each of which extends from the intermediate point, for which the intermediate lever is provided, to the end of the rotue at which a signal is located. Each control lever has three positions, comprising a normal or middle position, a reverse position to the right for arranging the switches and clearing the eastbound signal for the route, and a reverse position to the left for arranging the switches of the route and for clearing the westbound signal for the route. In order to arrange the switches of each route in the positions required for the route, and in order to clear the eastbound signal for the route, the operator will place all the levers for the route in their right reverse positions. Similarly, in order to arrange the switches of each route in the positions required for the route, and in order to clear the westbound signal for the route, the operator will place all the levers for the route in their left reverse positions.

In the first two forms of apparatus, a normal and a reverse indicator is provided for each switch. The normal indicator for each switch is energized only when a normal control relay for the switch is energized while the switch is in its normal position, and while the detector track section relay for the switch is energized. The reverse indicator for each switch is similarly energized only when a reverse control relay for the switch is energized while the switch is in its reverse position, and while a detector track relay for the switch is energized.

In Fig. 1$^A$ of the second form of apparatus, an arrangement is shown for protecting against false release of the switches in the event of a momentary loss of shunt in a detector track circuit for a switch.

In the third form of apparatus shown in the accompanying drawings, a group of three push button circuit controllers is shown for each route end, one of which is designated left, a second of which is designated right, and the third of which is designated a normal push button. One push button is also shown for each of given intermediate points of the routes.

In order to arrange the switches of any given route in the positions required for the route, and in order to clear the eastbound signal for the route by the third form of apparatus, the operator will depress the two right push buttons and the intermediate push button for the route. Similarly, in order to arrange the switches for any given route in the positions required for the route, and in order to clear the westbound signal for the route, the operator will depress the two left push buttons and the intermediate push button for the route.

Each of the three forms of apparatus is so adapted that when the apparatus is in condition for arranging the switches of any given route, and for clearing one of the signals for the route, a mistaken operation of the control levers or push buttons for a conflicting route will have no effect on the condition of the switches or of the signal for the given route.

In the first form of apparatus, a signal, when indicating proceed for any given route, will be placed at stop and permit a conflicting route to be arranged if any of the levers for the given route is moved to a different position. If, for example, signal $S^{1a}$ is indicating proceed, the operator can cause this signal to display the stop indication by changing the position of lever $K^1$ and thereby opening contact $201^{K1}$ in the circuit for the mechanism of signal $S^{1a}$, or by changing the position of lever $K^{ii}$ and thereby opening contact $189^{Kii}$ in the circuit for signal $S^{1a}$, or by changing the position of lever $K^5$ and thereby opening contact $177^{K5}$ in the circuit for signal $S^{1a}$.

The second and third forms of apparatus are so adapted that when the apparatus is in condition for arranging the switches of any given route and clearing one of the signals for the route, the signal can be put to stop, manually, and the route can be changed only upon operation of the lever or the normal push button for the route end at which the signal is located. The third form of apparatus is also adapted for the route stick relays for each route to be automatically deenergized when a train enters the route.

Figure 3A:
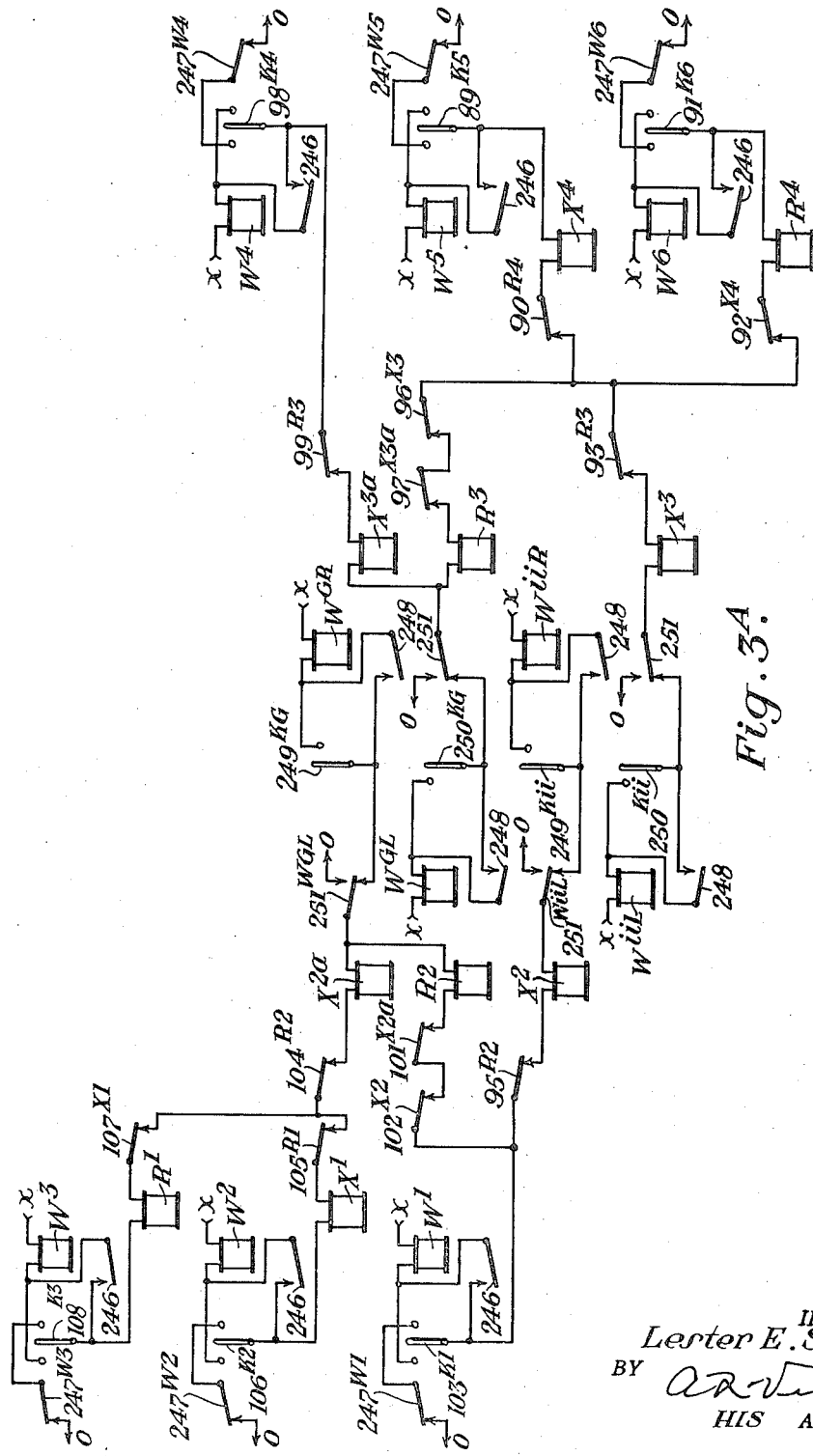

In the second form of apparatus, if, for example, route 1 has been arranged and signal $S^{1a}$ is indicating proceed, the route control apparatus shown in Fig. 3A can be restored to its normal condition only by changing the position of lever $K^1$ and thereby opening contact $103^{K1}$ in the circuit for relays $X^2$ and $W^{iiR}$. At the same time, the operator causes signal $S^{1a}$ to indicate "stop" by changing the position of lever $K^1$ and thereby opening contact $254^{K1}$.

Figure 3B:
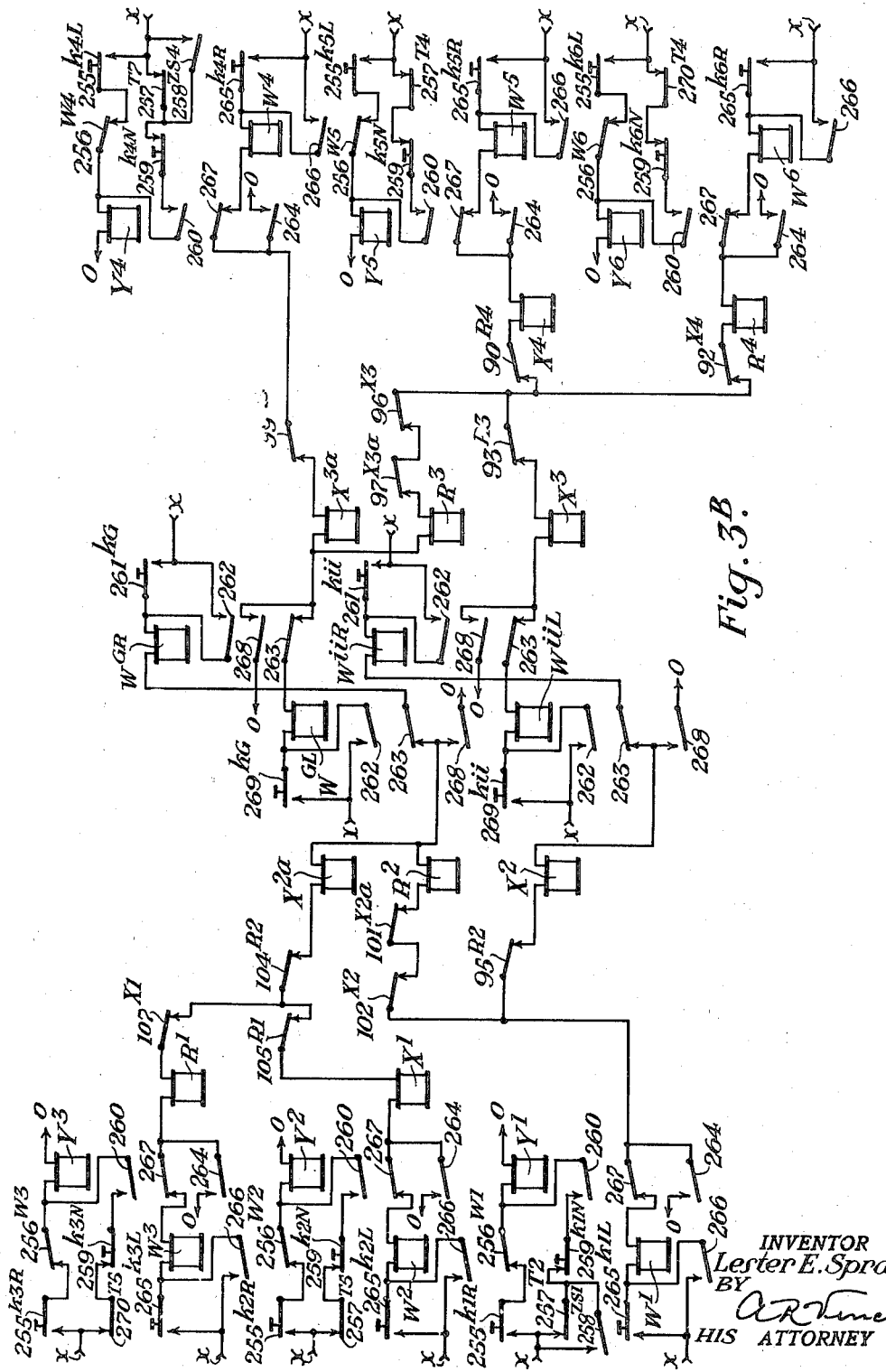

In the third form of apparatus, if, for example, signal $S^{1a}$ is cleared while the switches of route 1 are arranged in the positions required for the route, the apparatus of Fig. 3B can be restored to its normal condition only by a train deenergizing relay $T^2$ and thereby opening contact $257^{T2}$ in the stick circuit for relay $Y^1$, or by the operator opening contact $259^{k1N}$ in the stick circuit for relay $Y^1$. The deenergization of relay $Y^1$, by opening contact $277^{Y1}$ at its front point, will cause the arm of signal $S^{1a}$ to indicate "stop."

In the third form of apparatus, having push button circuit controllers biased to a normal position, indicators are provided to show the condition of the control apparatus. These indicators not only show the route for which the control apparatus has been arranged, but also show the direction of traffic movements for which the route has been arranged.

Although I have herein shown and described only three forms of interlocking control apparatus embodying my invention, it is understood that various changes and modifications may be made therein within the scope of the appended claims without departing from the spirit and scope of my invention.

Having thus described my invention, what I claim is:

1. In an interlocking control system for a plurality of railway tracks interconnected by switches to form a plurality of routes, a normal and a reverse control relay for each of said switches, a plurality of interconnected circuits for said plurality of routes each of said circuits including in series the control element of the normal or the reverse control relay for each switch in a corresponding route and also including manually controlled means and a source of current for operating the relays in the circuit, and means controlled by the normal and reverse control relays for each switch for operating the corresponding switch to normal and reverse positions respectively.

2. In an interlocking control system for a plurality of railway tracks interconnected by switches to form a plurality of routes, a normal and a reverse control relay for each of said switches, a plurality of interconnected circuits for said plurality of routes each of said circuits including the control winding of the normal control relay and a back contact of the reverse control relay or the control winding of the reverse control relay and a back contact of the normal control relay for each switch in a corresponding route and supplied with current by manually controlled means for operating the relays in the circuit, and means controlled by the normal and reverse control relays for each switch for operating the corresponding switch to normal and reverse positions respectively.

3. In an interlocking control system for a plurality of railway tracks interconnected by switches to form a plurality of routes, a normal and a reverse control relay for each of said switches, a manually controllable device for each route end, a circuit network comprising a plurality of circuits each of which corresponds to one of said routes and each of which includes in series the control element of the normal or the reverse control relay for each switch in the corresponding route and also the manually controllable device for each end of the route as well as a source of current for operating the relays of the circuit, and means controlled by the normal and reverse control relays for each switch for operating the corresponding switch to normal and reverse positions respectively.

4. In an interlocking control system for a plurality of railway tracks interconnected by switches to form a plurality of routes, a normal and a reverse control relay for each of said switches, a manually controllable device for each route end, a circuit network comprising a plurality of circuits each of which corresponds to one of said routes and each of which includes the control element of the normal control relay and a back contact of the reverse control relay or the control element of the reverse control relay and a back contact of the normal control relay for each switch in the corresponding route and also the manually controllable device for each end of the route and a source of current for operating the relays of the circuit, and means controlled by the normal and reverse control relays for each switch for operating the corresponding switch to normal and reverse positions respectively.

5. In an interlocking control system for a plurality of railway tracks interconnected by switches to form a plurality of routes, a normal and a reverse control relay for each of said switches, a manually controllable device for each route end and for given intermediate points, a circuit network comprising a plurality of circuits each of which corresponds to one of said routes and each of which includes the control element of the normal or the reverse control relay for each switch in the corresponding route and also the manually controllable device for each end of the route and for an intermediate point of the route as well as a source of current for operating the relays of the circuit, and means controlled by the normal and reverse control relays for each switch for operating the corresponding switch to normal and reverse positions respectively.

6. In combination, a plurality of railway tracks interconnected by switches to form a plurality of routes, a signal for each direction of traffic movements over each of said routes for governing traffic movements in the corresponding direction over each route, a normal and a reverse control relay for each of said switches for controlling operations of said switches to normal and reverse positions respectively, a manually operable route lever for each route end having a normal position and a first and a second reverse position, a plurality of first and second reverse contacts for each lever closed if and only if the corresponding lever is operated to its first or its second reverse position respectively, a circuit for each route controlled by a first or a second reverse contact of the lever for each end of the route and supplied with current for operating the normal or the reverse control relay for each switch of the route in the position required for the route, a circuit for controlling the signal which governs traffic movements in a first direction over each route controlled by a first reverse contact of the lever for each end of the corresponding route, and a circuit for controlling the signal which governs traffic movements in the opposite direction over each route controlled by a second reverse contact of the lever for each end of the corresponding route.

7. In combination, a plurality of railway tracks interconnected by switches to form a plurality of routes, a normal and a reverse control relay for each of said switches, a single manually operable route lever for each route end having a normal and a reverse position, a circuit for each route controlled by the route lever for each end of the corresponding route so that the circuit is closed only when both such levers are in their reverse positions for operating the normal or the reverse control relay for each switch of the route in the position required by the route, and means controlled by the normal and reverse control relays for each switch for operating the corresponding switch to the normal and reverse positions respectively.

8. In combination, a plurality of railway tracks interconnected by switches to form a plurality of routes, a signal for each direction of traffic movements over each of said routes for governing traffic movements in the corresponding direction over the corresponding route, a manually operable route lever for each route end and for given intermediate points in one or more routes having a normal position and a first and a second reverse position, a circuit for each route controlled by all the route levers for the corresponding route in their first reverse position for controlling the signal which governs traffic movements in a first direction over the same route, and a second circuit for each route controlled by all the route levers for the corresponding route in their second reverse position for controlling the signal which governs traffic movements in the opposite direction over the same route.

9. In combination, a track layout comprising a plurality of railway tracks interconnected by switches to form a plurality of routes, a normal and a reverse indicator lamp for each of said switches, manually controllable route apparatus for each route for selectively effecting the arrangement of all the switches of the corresponding route in the positions required for the route, and means controlled by said route apparatus for each route and by traffic conditions adjacent each switch for lighting the switch indicator lamps for the corresponding route only when said route apparatus is in the condition for effecting the arrangement of the switches in the corresponding route and when the route is clear adjacent each switch in the route.

10. In combination, a track layout comprising a plurality of railway tracks interconnected by switches to form a plurality of routes, a normal and a reverse indicator lamp for each of said switches, a manually controllable route circuit for each route for selectively effecting the arrangement of all the switches of the corresponding route in the positions required for the route, and means controlled by the route circuit for each route for lighting the normal or the reverse indicator lamp for each switch which is included in the corresponding route in the normal or the reverse position respectively only when the route circuit is in condition for effecting the arrangement of the switches of the corresponding route.

11. In combination, a track layout comprising a plurality of railway tracks interconnected by switches to form a plurality of routes, a normal and a reverse indicator lamp for each of said switches, a manually controllable route circuit for each route for selectively effecting the arrangement of all the switches of the corresponding route in the positions required for the route, and means controlled by the route circuit for each route for lighting the normal or the reverse indicator lamp for each switch which is included in the corresponding route in the normal or the reverse position respectively only when the route circuit is in condition for effecting the arrangement of the switches of the corresponding route and only when each switch of the corresponding route is in the position required for the route.

12. In an interlocking control system for a plurality of railway tracks interconnected by switches to form a plurality of routes, a normal and a reverse control relay for each of said switches, a manually operable lever for each route end, a route relay for each route end, a plurality of circuits one for each direction of traffic movements over each of said routes and each of which includes in series the control element of the normal or the reverse control relay for each switch in the corresponding route and also a contact controlled by the manually operable lever for each end of the route as well as the control element of the route relay for the exit end of the route for the direction of traffic movements with which the circuit is associated and also a source of current for operating the relays of the circuit, means controlled by the normal and reverse control relays for each switch for operating the corresponding switch to normal and reverse positions respectively, a signal for each route end, and means controlled by said route relays for operating said signals.

13. In an interlocking control system for a plurality of railway tracks interconnected by switches to form a plurality of routes, a manually operable lever for each route end, a route stick relay for each route end, switch control means for each route, a pickup circuit for each route stick relay controlled by the manually operable lever for each end of the route and by a back contact of the route stick relay for the opposite end of the route and including the switch control means for the corresponding route, a stick circuit for each route stick relay which is the same as its pickup circuit except including one of its own contacts instead of being controlled by the manually operable lever for the same end of the route, and mechanism controlled by the switch control means for each route for arranging switches of the corresponding route in the positions required by the route.

14. In an interlocking control system for a plurality of railway tracks interconnected by switches to form a plurality of routes, a manually operable lever for each route end, a route relay for each route end, switch control means for each route, a circuit for each route for controlling in series the route relay and the switch control means for the corresponding route controlled by the manually operable lever for each end of the route and by a back contact of the route relay for the opposite end of the route, and mechanism controlled by the switch control means for each route for arranging switches of the corresponding route in the positions required by the route.

15. In an interlocking control system for a plurality of railway tracks interconnected by switches to form a plurality of routes, a manually operable lever for each route end, a route relay for each route end, a circuit for controlling each route relay controlled by the manually operable lever for each end of the route and by a back contact of the route relay for the opposite end of the route, a signal for each end of each route for governing traffic movements in opposite directions over the corresponding route, and means controlled by the route relay for each end of each route for controlling a corresponding one of said signals.

16. In combination, a section of railway track including a switch, a track relay, a slow pickup relay controlled by a front contact of said track relay, a source of current, a pickup circuit for said track relay including the rails of said section and a back contact of said slow pickup relay as well as said source of current; a stick circuit for said track relay including one of its own front contacts and the rails of said section as well as said source of current, mechanism for operating said switch, and means controlled by a front contact of said track relay and by a front contact of said slow pickup relay for controlling said switch operating mechanism whereby a momentary false energization of the rails of said track section will not cause a dangerous operation of said switch.

17. In combination, a track and signal layout comprising a plurality of railway tracks interconnected by switches to form a plurality of routes and also a signal adjacent each end of each route for governing traffic movements through the corresponding route, a diagram or model of said track and signal layout, a group of three push buttons comprising a left and a right and a normal push button adjacent the representation of each signal on said diagram or model, means controlled by a left push button for each end of each route for arranging the switches of the corresponding route in the positions required for the route and for clearing the signal represented at the right-hand end of the representation of the route, means controlled by a right push button for each end of each route for arranging the switches of the corresponding route and for clearing the signal represented at the left-hand end of the representation of the route, and means controlled by each normal push button for putting to stop the signal represented adjacent the normal push button.

18. In combination, a track and signal layout comprising a plurality of railway tracks interconnected by switches to form a plurality of routes and also a signal adjacent each end of each route for governing traffic movements through the corresponding route, a group of three push buttons comprising a left and a right and a normal push button for each signal location, means controlled by the left push button for each pair of opposing signals for arranging the switches of the corresponding route and for clearing one of said signals, means controlled by the two right push buttons for each pair of opposing signals for arranging the switches of the corresponding route and for clearing the other signal of the pair, and means controlled by each normal push button for putting the associated signal to stop.

19. In an interlocking control system for a plurality of railway tracks interconnected by switches to form a plurality of routes, a group of three manually operable push buttons for each route end comprising a left and a right and a normal push button, a first and a second route relay for each route end, a pickup circuit for the first route relay for the first end of each route controlled by the corresponding right push button, a pickup circuit for the first route relay for the opposite end of each route controlled by the corresponding left push button, a stick circuit for each of said first route relays controlled by the corresponding normal push button, a pickup circuit for the second route relay for the first end of each route controlled by the corresponding left push button and by a back contact of the first route relay for the same end of the same route as well as by a front contact of the first route relay for the opposite end of the route, a pick-up circuit for the second route relay for the opposite end of each route controlled by the corresponding right push button and by a back contact of the associated first route relay as well as by a front contact of the first route relay for the first end of the route, and means controlled by said first and second route relays for governing traffic movements over said routes.

20. In an interlocking system for railroads; a track layout forming a plurality of routes with each route including a plurality of track switches operable to normal and reverse positions; route levers for the opposite ends of certain routes each of said levers having a normal position and a control position, each said lever being operable to either position independently of the positions of the other route levers, and means effective to operate said track switches from their last operated positions to normal and reverse positions as required for any route only when said route levers for the opposite ends of that route are both operated to their control positions.

21. In an interlocking system for railroads; a railroad track switch operable to normal and reverse positions by power driven means; a control lever for the facing side and a control lever for each trailing side of said track switch, said control levers having normal and operated positions, each said control lever being operable to either position independently of the positions of the other control levers, and switch control means for controlling the operation of said track switch to normal and reverse positions by the power driven means, said switch control means being responsive to the operation of said control lever for the facing side and said control lever for one trailing side both to their operated positions for causing the operation of said track switch to its normal position, and said switch control means being responsive to the operation of said control lever for the facing side and said control lever for the other trailing side both to their operated positions for causing the operation of said track switch to its reverse position.

22. In an interlocking system for railroads, a track layout having a plurality of tracks interconnected by a plurality of track switches to form a plurality of different routes, a plurality of signals at the ends of said routes for governing traffic through said track layout, a miniature track diagram corresponding to said track layout, a route button on said track diagram for each of said signals and in a corresponding position, contacts operated by each of said route buttons, a route circuit for each of said routes through said track layout and having included therein those of said contacts at its two opposite ends which are operated by the route buttons which correspond to the two signals at the opposite ends of such route, a route relay included in each of said route circuits, and means controlled by each of said route relays for operating each of said track switches included in its route and for clearing the one of said signals governing traffic over such route after such track switches have responded.

23. In an interlocking system for railroads, a track layout having a plurality of tracks interconnected by a plurality of track switches to form a plurality of different routes, a plurality of signals at the ends of said routes for governing traffic through said track layout, a miniature track diagram corresponding to said track layout, a route button on said track diagram for each of said signals and in a corresponding position, contacts operated by each of said route buttons, a route circuit for each of said routes through said track layout and having included therein those of said contacts at its two opposite ends which are operated by the route buttons which correspond to the two signals at the opposite ends of such route, a route relay included in each of said route circuits, switch operating means controlled by each route relay for operating each of said track switches included in its route to a position proper for establishing such route, signal control means controlled by each of said route relays for clearing the one of said signals governing traffic over such route, and means requiring said switches for a route to respond to their respective switch operating means before said signal control means for that route can be effective.

24. In an interlocking system for railroads, a track layout having a plurality of tracks interconnected by a plurality of track switches to form a plurality of different routes, a plurality of signals at the ends of said routes for governing traffic through said track layout, a miniature track diagram corresponding to said track layout, a route button on said track diagram for each of said signals and in a corresponding position, contacts operated by each of said route buttons, a route circuit for each of said routes through said track layout and having included therein those of said contacts at its two opposite ends which are operated by the route buttons which correspond to the two signals at the opposite ends of such route, a route relay included in each of said route circuits, switch operating means controlled by each route relay for operating each of said track switches included in its route to a position proper for establishing such route, signal control means controlled by each of said route relays for clearing the one of said signals governing tracffic over such route, manually operable means for a certain signal for imposing additional control on its signal control means subject to said route relays governing said signal control means to cause that signal to display a special indication, and means requiring said switches for a route to respond to their respective switch operating means before said signal control means for that route can be effective.

25. In an interlocking system for railroads; a plurality of routes through a track layout including a plurality of track switches; a signal for each route end for governing the movement of traffic through said layout, a single route button for each route end at each end of said track layout, each having a stop position and two clearing positions for opposite directions of traffic; means responsive to the joint operation of said route buttons for the two opposite ends of a route to corresponding clearing positions for automatically and completely setting up that route through said track layout by operating said track switches to normal and reverse positions as required and for clearing said signal governing traffic in a direction corresponding to the positions of said route buttons, and locking means rendered effective by the clearing of said signal for holding said track switches in their last operated positions after such route buttons are restored to their stop positions.

26. In an interlocking system for railroads, a track layout having a plurality of tracks interconnected by a plurality of track switches to form a plurality of different routes, a plurality of signals for governing traffic through said track layout, a miniature track diagram corresponding to said track layout, a route button on said track diagram for each of said signals and in a corresponding position, contacts operated by each of said route buttons, a route circuit for each of said routes through said track layout and having contacts at its two opposite ends which are operated by the route buttons which correspond to the two signals at the opposite ends of such route, a route relay for each of said route circuits and included therein, whereby the contemporaneous actuation of said route buttons for the two signals at the two opposite ends of a route cause said relay for that route to be picked up, stick circuit means for each of said route relays arranged to be effective to maintain a particular route relay picked up dependent only upon one of said two route buttons required to be actuated to effect the picking up of such route relay, switch operating means controlled by each route relay for operating each of said track switches included in its associated route to a position proper for establishing such route, signal control means controlled by each of said route relays for clearing one of said signals for governing traffic over such route, and means requiring said switches for a route to respond to their respective switch operating means before said signal control means for that route can be effective.

27. In an interlocking system for railroads, a track layout having a plurality of tracks interconnected by a plurality of track switches, a plurality of signals for governing traffic through said track layout, a miniature track diagram corresponding to said track layout, a route button on said track diagram for each of said signals and in a corresponding position, a route relay for each route through said track layout, circuit means for causing said relay for any route to be responsive only to the joint operation of said route buttons for the signals at the opposite ends of that route, and means controlled by each of said route relays for automatically controlling the track switches in said track layout to establish that route from one of the corresponding signals to the other and to clear the signal for such route.

28. In an interlocking system for railroads; a railroad track switch operable to normal and reverse positions by power driven means; a control lever for the facing side of said track switch provided with a normal and an operated position, said control lever being so constructed as to automatically return to its normal position after manual actuation to its operated position; a control mechanism for each trailing side of said track switch provided with normal and operated positions, said mechanisms being so constructed as to remain in their operated positions until manually restored; normal switch control means responsive to said control lever for the facing side and said control mechanism for one trailing side both in operated positions for causing the normal operation of said track switch; reverse switch control means responsive to said control lever for the facing side and said control mechanism for the other trailing side both in operated positions for causing the reverse operation of said track switch; means effective to render said normal switch control means dependent only upon said mechanism for said one traling side after such normal switch control means has responded to said control lever for the facing side and said control mechanism for said one trailing side both in operated positions; and means effective to render said reverse switch control means dependent only upon said control mechanism for said other trailing side after such reverse switch control means has responded to said control lever for the facing side and said control mechanism for said other trailing side both in operated positions.

29. In an interlocking system for railroads; a railway track switch operable to normal and reverse positions by power driven means; a control lever for the facing side of said track switch provided with a normal and an operated position, said control lever being so constructed as to automatically return to its normal position after manual actuation to its operated position; a control mechanism for each trailing side of said track switch provided with normal and operated positions, said mechanisms being so constructed as to remain in their operated positions until manually restored; normal switch control means responsive to said control lever for the facing side and said control mechanism for one trailing side both in operated positions for causing the normal operation of said track switch; reverse switch control means responsive to said control lever for the facing side and said control mechanism for the other trailing side both in operated positions for causing the reverse operation of said track switch; means effective to render said normal switch control means dependent only upon said mechanism for said one trailing side after such normal switch control means has responded to said control lever for the facing side and said control mechanism for said one trailing side both in operated positions; means effective to render said reverse switch control means dependent only upon said control mechanism for said other trailing side after such reverse switch control means has responded to said control lever for the facing side and said control mechanism for said other trailing side both in operated positions; signals for governing trailing point train movements over said track switch in each of its positions; signal control means effectively conditioned by said normal switch control means to clear that one of said signals for said track switch in a normal position only after said track switch has completely responded to such normal switch control means; and signal control means effectively conditioned by said reverse switch control means to clear that one of said signals for said track switch in a reverse position only after said track switch has completely responded to such reverse switch control means; whereby said signals for allowing train movements over said track switch clear only upon the joint operation of said control lever and one of said control mechanisms, and whereby a signal is maintained cleared wholly dependent upon only one of said control mechanisms.

30. In an interlocking system of the entrance-exit type, the combination with an actual track layout, of a control panel containing a miniature track layout corresponding to said actual track layout, an entrance button and an exit button located at each end of a plurality of routes on said miniature track layout, an indicating lamp associated with each of said buttons, means for setting up a route on the actual track layout only if an entrance button and an exit button have been operated, and means for lighting the indicators associated with said operated buttons only in response to operation of both of said buttons.

31. In an interlocking system of the entrance-exit type, the combination with an actual track layout in the field and a corresponding miniature track layout on a panel in the office, of manually operable means at each end of said miniature track layout, two indicating lamps associated with each of said manually operable means, one of said lamps reflecting traffic in one direction and the other of said lamps reflecting traffic in the other direction, and means for setting up traffic in a particular direction over a particular route on the actual layout and for lighting lamps at opposite ends of the corresponding route on the miniature track layout indicating traffic in the corresponding direction only in response to operation of the manually operable means located at the entrance and exit of the corresponding route on the miniature track layout.

32. A system for operating switches and signals for railroads comprising, a plurality of track switches operable to positions to establish any one of a plurality of routes over a portion of track, each of said routes including all of said switches with one or more of said track switches being in different positions for the different routes; a power operated switch machine for each switch; a switch control relay associated with each switch machine and operable to control operation of said switch machine to either the normal or the reverse position; a control machine including a miniature diagram comprising a representation of the track layout and a plurality of manually operable devices, said devices being located on said diagram at the points which correspond to the entering or leaving ends of said routes, said manually operable devices each having a normal inactive and an operated position; means operable to establish any one of said routes by controlling the energization of said switch control relays to operate all of the switch machines from their existing positions to the positions required for such route, said means being rendered effective for a particular route only if said manually operable devices at the entering and leaving ends of the representation of that route on said diagram are both actuated to their operated positions, said switch control relay belonging to each switch in said particular route being controlled only if said means for that route is rendered effective; signals for governing train movement over said routes; and means for allowing clearing of each signal only if all of the track switches in the route for that signal have been operated to positions corresponding with the controlled condition of said switch control relays.

33. An interlocking system for operating track switches on railroads comprising, a plurality of track switches each operable to a normal or a reverse position to establish a plurality of routes for train movement, each of said routes including all of said switches, some of said routes being conflicting by requiring at least one of said switches to be in different positions; a control machine including a miniature diagram comprising a representation of the track layout and a plurality of levers, there being one lever on said diagram at each of the points corresponding to the entrance and exit ends of said routes; a plurality of circuits each closed and energized only if both of the levers at the opposite entrance and exit ends of the representation of a corresponding route are actuated; means controlled by the energization of each of said circuits for governing the operation of all of said track switches each from its existing position to either the normal or reverse position as required to establish the route the entrance and exit ends of which correspond to the entrance and exit levers actuated to establish that circuit; and electro-responsive means included in each of said circuits and acting when that circuit is energized to prevent the energization of all of the circuits establishing conflicting routes.

34. In combination; a track layout including a plurality of track switches operable to positions to establish any one of a plurality of routes each including a plurality of track switches of which some routes conflict with each other; a switch machine for each track switch; electro-responsive means for each route for controlling the switch machines for the track switches for that route to the normal or the reverse positions as required to establish such route; a single lever for each terminating point of said routes each having a normal inactive and an active position; circuit means responsive only to the joint operation of the levers for the two terminating points of a particular route to their active positions to energize the electro-responsive means for that route to cause all the track switches in that route to assume a position to establish such route; back contacts on the electro-responsive means of the routes which conflict with each other included in the circuit means for the conflicting routes; signals for governing train movement over said routes; and means governed in part by the electro-responsive means of such particular route and by contacts reflecting the positions of the switches in such particular route to allow clearing of the signal at the entrance end of such route only if such electro-responsive means is energized and all of the switches in that route assume positions to establish such route.

35. In combination; a track layout including a plurality of track switches operable to positions to establish any one of a plurality of routes each including a plurality of track switches; a switch machine for each track switch; electro-responsive means for each route for controlling all the switch machines for the track switches for that route to normal or to reverse positions as required to establish such route; a single lever for each terminating end of the routes each having a normal inactive position, an entrance position and an exit position; means responsive to the joint operation of the lever at the entrance to a particular route to its entrance position and the lever at the exit end for that route to its exit position to energize the electro-responsive means for that route for operating all of the track switches in that route to a position to establish such route; stick circuit means associated with each electro-responsive means for maintaining it energized independently of the restoration of the lever at the exit end of the particular route to its inactive position; a signal for controlling the entrance of traffic into such particular route; and a signal circuit for controlling said signal and including a contact controlled by the electro-responsive means of such particular route and including contacts assuming positions in accordance with the positions of the track switches in such particular route and closed only if all of said track switches assume positions to establish such route.

36. In an interlocking system of the entrance-exit type, the combination with an actual track layout in the field and a corresponding miniature track layout on a panel in the office, of manually operable means at each end of said miniature track layout, two indicating lamps associated with each of said manually operable means, one of said lamps reflecting traffic in one direction and the other of said lamps reflecting traffic in the other direction, and means for setting up traffic in a particular direction over a particular route on the actual track layout and for lighting lamps at opposite ends of the corresponding route on the miniature track layout indicating traffic in the corresponding direction only in response to operation of the manually operable means located at the entrance and exit end of the corresponding route on the miniature track layout.

37. An interlocking system of the type described comprising, an actual track layout in the field including a plurality of conflicting routes, a panel in a control office containing a miniature track layout comprising a representation of said actual track layout, an indication lamp and a manually operable means at each point representing the end of a route on said miniature track layout, electro-responsive means operated only if the manually operable means at each end of the representation of a particular route is operated, means controlled by said electro-responsive means for setting up a corresponding route on the actual track layout, and means controlled by said electro-responsive means for energizing the indicating lamps located at the ends of the representation of the route with which said electro-responsive means is associated.

38. A railway switching system, comprising a stretch of railway track in which there is a plurality of railway track switches each having a normal and a reverse position and in which stretch of track various combinations of said switches in normal and reverse positions can be arranged to form a plurality of routes, a plurality of manually operable levers, a pair of said levers for each of said routes each of said levers being operable to each of its control positions independently of the other levers, and means controlled by each pair of levers for controlling the arrangement of all the switches in the corresponding route to the positions required for that route, said means being interlocked electrically with similar means controlled by another pair of said levers.

39. A railway switching system, comprising a stretch of railway track in which there is a plurality of railway track switches each having a normal and a reverse position and in which stretch of track various combinations of said switches in normal and reverse positions can be arranged to form a plurality of routes, a plurality of mechanically independent manually operable levers, a pair of said levers for each of said routes, means controlled by each pair of levers for controlling the arrangement of all the switches in the corresponding route to the positions required for that route, said means being interlocked electrically with similar means controlled by another pair of said levers, a signal for governing the movement of traffic in each direction over each of said routes respectively, and means for clearing each of said signals by the pair of levers for its route.

40. In combination, a stretch of railway track including a plurality of switches in a plurality of partly inter-inclusive routes, a plurality of partly inter-inclusive pairs of mutually mechanically independent devices, one pair for each route, signals for governing traffic movements over each of said routes, and means controlled by each pair of devices for controlling said switches and said signals.

41. In combination, a stretch of railway track including a plurality of switches in a plurality of partly inter-inclusive routes, a plurality of partly inter-inclusive pairs of mutually mechanically independent devices one pair for each of said routes, and means controlled by each of said pairs of devices for controlling the switches in its route.

42. In combination, a stretch of railway track including a plurality of switches which can be arranged to form a plurality of partly inter-inclusive routes, signals for each direction of traffic movement through said routes, a pair of mutually mechanically independent control devices for each of said routes, means responsive to the operation of both devices of each of said pairs of devices for arranging the switches in the corresponding route and for clearing the signal for a given direction of traffic through said route, and means responsive to a different operation of both devices of each of said pairs of devices for arranging the switches of the corresponding route and for clearing the signal for the opposite direction of traffic through said route.

43. In an interlocking system for railroads, a track layout having a plurality of tracks interconnected by a plurality of track switches, a plurality of signals at the opposite ends of said tracks for governing traffic through said track layout, a miniature track diagram corresponding to said track layout, a rotary route button on said track diagram for each of said signals and in a corresponding position, each of said buttons being operable in either direction from a normal position, and means responsive to the joint operation in the same direction of two of said route buttons at opposite ends of said diagram for automatically controlling the track switches in said track layout to establish a route from one of the corresponding signals to the other and to clear the signal for that direction of traffic over such route which corresponds with the direction of operation of said buttons.

44. In an interlocking system for railroads, a track layout having a plurality of tracks interconnected by a plurality of track switches, a plurality of signals for governing traffic through said track layout, a miniature track diagram corresponding to said track layout, a route button on said track diagram for each end of each track, each located in a corresponding position, and means responsive to the joint operation of said route buttons at the opposite ends of any route through said track layout for automatically controlling the track switches in said track layout to establish that route from one of the corresponding signals to the other and to clear the signal for such route.

45. In an interlocking system for railroads; a plurality of routes through a track layout; signals for governing the movement of traffic through said track layout; a single route device for each route end at each end of said track layout, each having a stop position and two clearing positions for opposite directions of traffic; means responsive to a single operation of said route devices for the two opposite ends of a route to corresponding clearing positions for operating the track switches as required for automatically and completely setting up that route through said track layout and clearing said signal governing traffic in a direction corresponding to the positions of said route devices.

46. In an interlocking system for railroads, a track layout having a plurality of tracks interconnected by a plurality of track switches operable to normal and reverse positions to form different traffic routes, a plurality of signals for governing traffic through said track layout in opposite directions, a miniature track diagram corresponding to said track layout, a route button on said track diagram for each of said signals and in a corresponding position, and means responsive to the joint operation of said route buttons for the signals at the opposite ends of any route through said track layout but requiring the button for only one of said signals to be retained in its operated position for automatically controlling the track switches in said track layout to normal and/or reverse positions to establish that route from said one of the corresponding signals to the other and to clear said one signal for such route.

47. In an interlocking control system for a plurality of railway tracks interconnected to form a plurality of routes, a manually controllable entrance device and a manually controllable exit device for each of said routes, means controlled by both the entrance device and the exit device for each of said routes for directing traffic movements over the corresponding route, an indication device associated with each of said exit devices, and means controlled by both the entrance device and the exit device for each route for energizing the indication device associated with the exit device for the same route.

48. In combination, a control panel having a track layout represented thereon as including two track sections connected by a track switch, a normal indicator for illuminating one of said represented track sections, a reverse indicator for illuminating the other of said represented track sections, entrance and exit buttons on said control panel for ends of said track sections, means dependent upon the operation of an entrance button for one end of a track section and an exit button for the opposite end of such track section for causing the normal or reverse operation of said track switch in the actual track layout as required to set up a route over that track section, and means dependent upon the operation of said entrance and exit buttons for energizing said normal or said reverse indicator when a route is set up over said one or said other track section.

49. In combination, a track layout including two track sections connected by a track switch and having signals for governing traffic thereover, a control panel having said track layout represented thereon by having distinctive portions for said two track sections, a first indicator for illuminating one of said portions, a second indicator for illuminating the other of said portions, entrance and exit buttons on said control panel for the ends of said track sections, means effective upon the joint operation of only an entrance button for one end of a track section and an exit button for the opposite end of such track section for causing the normal or reverse operation of said track switch and the clearing of the proper signal to set up a route over that track section, and means controlled by said joint operation of said entrance and exit buttons for selectively energizing said first or second indicators whereby that portion of the control panel representative of the track section included in a cleared route is distinctively illuminated.

50. In an interlocking system for railroads, a track layout made up of sections of track interconnected by track switches to form a plurality of routes with signals governing traffic at the entrances to such routes, entrance buttons for the entrances to said routes, exit buttons for the ends of said routes, route establishing means for setting up a route in response to the joint actuation of only the entrance and exit buttons for that route by operating the track switches in such route and clearing its signal, a miniature track diagram having miniature track portions corresponding to said track sections of said track layout, and means for indicating each route set up by illuminating those portions of the miniature track diagram corresponding to the track sections actually included in that route, said means being controlled in part by said route establishing means and in part by the traffic conditions in said track sections.

51. In an interlocking system for railroads, a track layout including a plurality of railway tracks interconnected by track switches to form a plurality of traffic routes, an entrance circuit controller for each route end, an exit contact for each route end, a stick relay for the exit end of each route, a route circuit network including a circuit for each route through the track layout, means for energizing each route circuit in response to the joint operation of the entrance circuit controller for one end and the exit contact for the other end of the corresponding route, means including the stick relay for the exit end of said route for maintaining said route circuit energized until said entrance circuit controller is released, and means controlled by the energized route circuit for operating the track switches as required to establish the corresponding traffic route through the track layout.

52. In an interlocking system for railroads, a track layout including a plurality of railway tracks interconnected by track switches to form a plurality of traffic routes, an entrance circuit controller for each route end, an exit contact for each route end, a stick relay for the exit end of each route controlled by the corresponding exit contact, a route circuit network including a circuit for each route through the track layout each such circuit including the winding and a front contact of the stick relay for its exit end and a contact closed only when the circuit controller for its entrance end is in its operated position, and means controlled by each route circuit when energized for operating the track switches to normal or reverse as required to establish the corresponding traffic route through the track layout.

53. In an interlocking system for railroads, a track layout including a plurality of railway tracks interconnected by track switches to form a plurality of traffic routes, including two alternative routes between the same route ends, a manually operable contact for each route end, a route circuit network corresponding to said track layout and including a route circuit for each traffic route, each such circuit being energized in response to the joint operation of the manually operable contacts for the two ends of the corresponding route, selecting means effective to determine which of the two route circuits for said alternative routes is to be effectively energized, and means controlled by each route circuit when energized to operate the track switches to normal or reverse as required to establish the corresponding traffic route.

54. In an interlocking system for railroads, a track layout including a plurality of railway tracks interconnected by track switches to form a plurality of traffic routes, an entrance circuit controller for each route end, an exit contact for each route end, a stick relay for the exit end of each route controlled by the corresponding exit contact, normal and reverse switch control relays for operating the track switches to the corresponding normal or reverse position, a route circuit network including a circuit for each route through the track layout each such circuit including the winding and a front contact of the stick relay for its exit end and a contact closed only when the circuit controller for its entrance end is in its operated position and also including back contacts of those normal and reverse switch control relays which operate the track switches to positions conflicting with such route, and means effective when a particular route circuit is energized for energizing those normal and reverse switch control relays which operate the track switches to positions in accordance with the corresponding route.

55. In an interlocking system for railroads, a plurality of railway tracks interconnected by switches to form a plurality of routes, manually operable contact means for each route end, an entrance relay for each route end, an exit relay for each route end, a circuit for each entrance relay controlled by said manually operable contact means for its route end and including a back contact of the exit relay for that route end, a pick-up circuit for each exit relay controlled by said manually operable contact means for its route end and including a back contact of the entrance relay for that route end, normal and reverse switch control relays for each of said switches for controlling that switch to its normal and reverse positions respectively, a circuit network including said normal and reverse control relays rendered effective to automatically energize the proper normal or reverse control relay for each track switch in a particular route to establish that route only when the entrance relay for one end of that route and the exit relay for the opposite end of that route are both picked up, a signal at each route end for governing the entrance of traffic into the routes emanating from that point, and means controlled by said entrance and exit relays for operating said signals.

56. In an interlocking system for railroads; a plurality of railway tracks interconnected by switches to form a plurality of routes; normal and reverse control relays for each of said switches; manually operable contact means for the ends of said routes; a circuit network having route circuits corresponding to said routes and each route circuit energizing those of said normal and reverse control relays required to be energized to set up the corresponding route, said circuit network being selected by said control relays in a manner effective to isolate each energized route circuit from all conflicting route circuits, a particular route circuit of said circuit network being energized in response to the operation of said manually operable contact means for the opposite ends of the corresponding route; normal and reverse indicator lamps for said track switches; and circuit means for energizing each of said indicator lamps only when the corresponding normal or reverse control relay for that switch is energized.

57. In an interlocking system for railroads; a plurality of railway tracks interconnected by switches to form a plurality of routes; a miniature track diagram forming a replica of said track layout; manually operable control means for the ends of said routes; normal and reverse control relays for each of said track switches; a circuit network having route circuits corresponding to said routes, each route circuit being capable, when energized, of energizing those of said normal and reverse control relays required to be energized to set up the corresponding route, said circuit network being selected by said control relays in a manner effective to isolate each energized route circuit from all conflicting route circuits, a particular route circuit of said circuit network being energized in response to the joint operation of said manually operable contact means for the opposite ends of the corresponding route; indicator lamps for each position of each track switch so located on said track diagram as to indicate the route set up when illuminated; and circuit means for each indicator lamp controlled by its corresponding normal or reverse control relay so as to cause the lamp to be illuminated only when such control relay is picked up.

58. In combination, a detector section of railway track including a two-position track switch, a track relay for said detector section, indication means controlled in accordance with the position and locked condition of the track switch, a track diagram arranged to form a miniature representation of said stretch, a lamp for illuminating each branch track of said diagram extending in a trailing direction from the representation of the track switch, and a circuit controlled by a contact of said track relay and by said indication means for lighting one branch track lamp or the other in accordance with the position of the track switch.

59. In a switch and signal control system, a plurality of track portions interconnected by track switches to form a plurality of routes through a track layout between signal locations, a circuit network including circuit portions corresponding to said track portions and connected to conform to the routes through said track layout, normal and reverse control relays for each of said track switches for governing the normal and reverse operation of the corresponding track switches, manually operable control means for each of said signal locations, means including said circuit network and effective in response to the operation of a manually operable control means for an entrance and an exit point to energize those of said normal and reverse control relays required to set up a route between said points, contacts of said normal and reverse relays included in said circuit network and effective when the control relays for the track switches of a particular route are energized to set up that route to isolate the circuit portions of said network corresponding to that particular route, and circuit means for clearing a signal at the entrance end to said route dependent upon the continued energization of said circuit portions corresponding to said particular route.

60. In an interlocking system for railroads, a plurality of optional routes through a track layout, a signal at the common entrance to said optional routes, an entrance button for the common entrance to said optional routes, an exit button for the common exit of said routes, means responsive to the joint operation of said entrance and exit buttons for clearing a predetermined one of said optional routes, and means responsive to the joint operation of said entrance and exit buttons for clearing another of said optional routes when said predetermined one of said routes is unavailable for use.

61. In an interlocking system for railroads; a plurality of routes through a track layout, certain ones of which have a common entrance and a common exit; a signal governing traffic at each entrance; an entrance button for each entrance; an exit button for each exit; means responsive to the joint actuation of an entrance button and an exit button for setting up a route between corresponding entrance and exit points and clearing said signal at the entrance to said route; and manually operable means for selecting which particular one of said routes having a common entrance and a common exit shall be set up when the corresponding entrance and exit buttons are actuated.

62. In an interlocking system for governing the operation of track switches and signals of a track layout having a plurality of routes over the track switches, signals for governing traffic over said routes in opposite directions, a single manually operable entrance button and a single independently manually operable exit button for each route end in said layout, and electro-responsive route establishing means for each route, said route establishing means for a given route being rendered effective by the joint actuation of the entrance button for one end and the exit button for the other end of that route, said route establishing means for each route controlling the operation of all of the track switches to set up such route and also controlling the clearing of the signal for the end of that route corresponding to the end at which an entrance button was actuated, whereby the establishing of a route and the direction of traffic over this route is determined by the actuation of an entrance button and a corresponding exit button for opposite ends of that route.

63. In an interlocking system for manually controlling the power operation of track switches and signals of a track layout affording a plurality of routes between signal locations, a single manually operable entrance button for each signal location, a single manually operable exit button associated with each entrance button to define that signal location as the exit end of any route beginning at the signal location corresponding to another entrance button, and route establishing means for each route requiring only the operation of an entrance button and an exit button belonging to and identifying the opposite ends of that route to be rendered effective, each of said route establishing means when thus rendered effective automatically controlling the operation of all of the track switches in the corresponding route to the proper normal or reverse positions and also controlling the clearing of the signal for that route corresponding to the entrance button actuated.

64. In a system for governing the operation of track switches and signals of a railroad track layout, a control machine comprising a miniature track diagram of said track layout, said track layout including an arrangement of switches to provide two alternative routes from one signal location to another signal location, manually operable buttons associated with said track diagram and located thereon at points corresponding with said signal locations, means responsive to the joint actuation of said buttons for operating all the track switches to positions required for one of said alternative routes, and means also rendered effective by the actuation of said two buttons for controlling one or more of said switches to a different position to establish the other of said alternative routes if the first route is not available.

65. In a switch and signal control system for a railway track layout having at least two alternative routes with common entrance and exit points and also having one or more other routes conflicting with a particular one of said alternative routes, a control machine including manually operable buttons for the entrance and exit points of said alternative routes, means responsive to the joint actuation of said entrance and exit buttons for setting up said particular one route, other means also responsive to the joint actuation of the same entrance and exit buttons for setting up the other of said alternative routes provided one of said conflicting routes is established to prevent setting up said particular one route.

66. In a switch and signal control system for a railway track layout having a plurality of routes and at least two alternative routes with common entrance and exit points, two route establishing circuits one for each of said alternative routes, means effective upon energization of either of said route circuits for preventing the energization of the other, manually operable buttons for said common entrance and exit ends of said alternative routes effective upon the joint actuation thereof to supply energizing current to both of said route circuits, another route establishing circuit for a route conflicting with a preferred one of said alternative routes, and means effective upon the energization of said another conflicting route circuit for preventing energization of the route circuit for the preferred route and permitting energization of the other route circuit by the joint actuation of said buttons.

67. In a system for governing the operation of track switches and signals of a track layout having an arrangement of switches to provide at least two alternative routes between two signals for governing traffic in opposite directions over such two routes, a control machine including manually operable buttons corresponding with said signals, route establishing means at times responsive to the joint operation of said buttons for governing the position of the track switches to set up one of said alternative routes and to clear one of said signals for governing traffic thereover, other route establishing means at other times responsive to the joint actuation of said same buttons for governing the position of the track switches to set up the other of said two alternative routes and to clear one of said signals for governing the passage of traffic thereover, selecting means for determining which of said route establishing means will respond to the operation of said buttons, and means for maintaining each of said route establishing means effective after response thereof irrespective of any subsequent change in said selecting means.

68. In a system for governing the operation of track switches and signals of a track layout having an arrangement of switches to provide at least two alternative routes between common entrance and exit points, a control machine having manually operable buttons for the entrance and exit of said alternative routes, means at times responsive to the joint operation of said buttons for governing the position of the track switches to establish one of said alternative routes, means at other times responsive to the joint actuation of said buttons for governing the position of the track switches to set up the other of said two alternative routes, a manually operable device for selecting which of said first and second means will be rendered effective by such operation of said buttons, and means for maintaining each of said means effective after actuation thereof regardless of any change of said manually operable device.

69. In a system for controlling operation of power-operated track switches and signals of a railway track layout, a control machine comprising a diagram of a track layout and manually operable buttons for the entrance and exit ends of available routes through various portions of track over said track switches mounted at corresponding locations on said diagram, electro-responsive route means individually appertaining to each of such routes and rendered effective by the manual operation of the buttons for the entrance and exit ends of the corresponding route, and only if both buttons are operated, said electro-responsive means for a given route including contacts closed for the normal or reverse position of each of the track switches in that route, signal control means for governing the clearing of each signal at the ends of said routes, and circuit means for rendering a given signal control means effective only if all of the switches of the corresponding route have been operated to positions corresponding with the contacts of said electro-responsive means for that route, whereby the clearing of each signal is dependent upon the proper positioning of the switches in accordance with the electro-responsive means rendered effective by the manual operation of the buttons for the entrance and exit ends of such route.

70. In a system of the character described for governing the operation of track switches and signals of a railway track layout, in combination with a diagram representing the track layout and having manually operable buttons associated with the entrance and exit ends of the var'ous routes over said switches between signals located thereon at corresponding points, a route circuit for each of said routes energized by manual operation of both of the buttons located respectively at the entrance and exit ends of the representation of that route, means responsive to the energization of a given route circuit for controlling the operation of all of the track switches in that route to the normal or reverse position as required, and means including contacts directly operated by the energization of a given route circuit for controlling the clearing of a signal for that route only if all of the switches for that route have been operated to positions in accordance with the position of said contacts.

71. In an interlocking system for railroads, a track layout comprising a plurality of track sections adapted to be interconnected by track switches to form different traffic routes, a track relay for each track section, a track diagram representing said track layout provided with a plurality of lamps mounted in the representations of the track sections for displaying an illuminated representation of each different traffic route through said layout, route control means for each route effective when actuated to operate one or more of the track switches as required to establish said route through the track layout, means effective upon actuation of said control means to light certain of said lamps to indicate the sections of said route that are already established, means rendered effective when the operated switches assume their operated positions to light certain other lamps of said diagram to indicate a complete route as soon as said route is fully established, and means governed by said track relays for controlling said lamps successively to indicate the successive occupancy of said sections by a train.

72. In combination, a track layout including parallel main track sections connected by a crossover, a track relay for each main track section, a track diagram arranged to form a miniature representation of said track layout and provided with a plurality of lamps for illuminating the tracks of said diagram including one for each main track and one for the crossover track, switch indication means controlled in accordance with the position of the track switches of said crossover, means controlled by both track relays and by said switch indication means for lighting the crossover lamp only when the track switches are set for a movement from one main track to the other, and means controlled by each track relay for illuminating the main track lamp for the corresponding track only when the track switches are set for parallel train movements over the main tracks.

73. In an interlocking system for railroads, a track layout comprising a plurality of track sections adapted to be interconnected by track switches to form different traffic routes, a track diagram comprising a miniature representation of said track layout and provided with a plurality of lamps mounted in the representations of the track sections for displaying an illuminated representation of each different traffic route through said layout, route control means for each route effective when actuated to operate one or more of the track switches as required to establish said route through the track layout, means effective upon actuation of said control means to light certain of said lamps to indicate the sections of said route that are already established, and means rendered effective when the operated switches assume positions in accordance with said route to light certain other lamps of said diagram to thereby indicate a complete route as soon as said route is fully established.

74. In an interlocking system for railroads, a track layout including parallel railway track portions interconnected by track switches to provide a plurality of passageways from each end of the layout to the other end; an entrance circuit controller, an exit contact and a stick relay for each end of each track portion; a circuit network corresponding to said track layout and including a circuit for each passageway through said layout each said circuit extending from an entrance circuit controller for one end to the stick relay for the other end of said layout and including the winding and front contact of the stick relay and a contact closed only when the circuit controller for its entrance end is in its operated position; a pickup circuit for each stick relay including the associated exit contact, electroresponsive means controlled by each said circuit and maintained energized as long as said circuit is closed, and apparatus controlled by said electroresponsive means for operating the track switches as required to establish the corresponding passageway through said track layout.

75. In an interlocking system for railroads, a track layout forming a plurality of routes with each route including a plurality of track switches, a control board comprising a track diagram representing said track layout with independently operable control devices for the ends of said routes